(12) United States Patent
Cotoros et al.

(10) Patent No.: US 11,445,126 B2
(45) Date of Patent: Sep. 13, 2022

(54) IMAGE CAPTURE DEVICE WITH INTERCHANGEABLE INTEGRATED SENSOR-OPTICAL COMPONENT ASSEMBLIES

(71) Applicant: GoPro, Inc., San Mateo, CA (US)

(72) Inventors: Ingrid A. Cotoros, Hillsborough, CA (US); Nicholas D. Woodman, Big Sky, MT (US); Sandor Lee Barna, Los Altos, CA (US); Jonathan Stern, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/215,453

(22) Filed: Mar. 29, 2021

(65) Prior Publication Data
US 2021/0218872 A1 Jul. 15, 2021

Related U.S. Application Data

(63) Continuation of application No. 16/231,765, filed on Dec. 24, 2018, now Pat. No. 10,999,528.

(60) Provisional application No. 62/611,670, filed on Dec. 29, 2017, provisional application No. 62/611,199, filed on Dec. 28, 2017.

(51) Int. Cl.
*H04N 5/238* (2006.01)
*H04N 5/225* (2006.01)
(Continued)

(52) U.S. Cl.
CPC ........... *H04N 5/238* (2013.01); *H04N 5/2254* (2013.01); *H04N 5/2257* (2013.01);
(Continued)

(58) Field of Classification Search
CPC .......... H04N 5/23209; H04N 5/23245; H04N 5/2252; H04N 5/2253; H04N 5/2355; H04N 5/355–3559; H05K 5/00–069; H05K 7/00–2099; G03B 35/00–26; G06T 5/007–009; G06T 2207/20208
(Continued)

(56) References Cited

U.S. PATENT DOCUMENTS 10,999,528 B2 * 5/2021 Cotoros ............. H04N 5/23216
2003/0038883 A1 2/2003 Takahashi
(Continued)

OTHER PUBLICATIONS

Ricoh GXR/A12 50mm Review, Interchangeable lens units; URL: https://www.dpreview.com/reviews/ricohgxra12/2, published Mar. 2, 2010, 8 pages.
(Continued)

*Primary Examiner* — Xi Wang
(74) *Attorney, Agent, or Firm* — Young Basile Hanlon & MacFarlane, P.C.

(57) ABSTRACT

An image capture device includes an image capture module and a base module. The image capture module is releasably connectable to the base module. The image capture module includes an integrated image sensor and optical component for capturing image data. The base module includes a processor. The processor is configured and the base module is calibrated based on identification data provided by the image capture module when releasably connected to the base module. The image information and identification data may be wirelessly transferred from the image capture module to the base module.

20 Claims, 15 Drawing Sheets

(51) Int. Cl.
   *H04N 5/232*    (2006.01)
   *H04N 17/00*    (2006.01)
(52) U.S. Cl.
   CPC ....... *H04N 5/2258* (2013.01); *H04N 5/22521* (2018.08); *H04N 5/23209* (2013.01); *H04N 5/23216* (2013.01); *H04N 5/23241* (2013.01); *H04N 5/232933* (2018.08); *H04N 17/002* (2013.01)
(58) Field of Classification Search
   USPC .......................... 348/208.1, 220.1, 373–376; 396/324–332; 352/57–65; 361/600–837
   See application file for complete search history.

(56) References Cited

U.S. PATENT DOCUMENTS

| | | | |
|---|---|---|---|
| 2005/0117051 A1 | 6/2005 | Cheng | |
| 2011/0317990 A1* | 12/2011 | Imafuji | G03B 17/14 396/133 |
| 2014/0375851 A1* | 12/2014 | Lee | G01S 7/497 348/294 |
| 2017/0150032 A1 | 5/2017 | Chenn | |
| 2017/0339329 A1 | 11/2017 | Lee | |
| 2018/0059758 A1 | 3/2018 | Boatner | |

OTHER PUBLICATIONS

Ricoh GXR Interchangeable Unit Digital Camera System with 3-Inch High-Resolution LCD; URL: https://www.amazon.com/Ricoh-GXR-Interchangeable-Digital-High-Resolution/dp/B002W6Z1JA/ref=pd_lpo_sbs_421_t_1?_encoding=UTF8&psc=1&refRID=DT16HFZKK11YHCZEWWXM; Retrieved on Jan. 14, 2019, 8 pages.

Ricoh A12 50mm f/2.5 Macro GR Lens with APS-C 12.3 MP CMOS Sensor; URL: https://www.amazon.com/Ricoh-A12-50mm-GR-Sensor/dp/B002W6Z1JK; Retrieved Jan. 14, 2019, 7 pages.

* cited by examiner

IMAGE CAPTURE DEVICE WITH INTERCHANGEABLE INTEGRATED SENSOR-OPTICAL COMPONENT ASSEMBLIES

CROSS-REFERENCE TO RELATED APPLICATIONS

This application is a continuation of U.S. application patent Ser. No. 16/231,765, filed Dec. 24, 2018, entitled "Image Capture Device with Interchangeable Integrated Sensor-Optical Component Assemblies", which claims priority to and the benefit of U.S. Provisional Application Patent Ser. No. 62/611,670, filed Dec. 29, 2017, entitled "Digital Image Capturing Device with Interchangeable Integrated Sensor-Lens Assemblies," and U.S. Provisional Application Patent Ser. No. 62/611,199, filed Dec. 28, 2017, entitled "Modular Camera System," the entire disclosures of which are hereby incorporated by reference.

TECHNICAL FIELD

This disclosure relates to image capture devices, in particular, image capture devices having interchangeable integrated sensor-optical component assemblies.

BACKGROUND

Image capture devices are used in various applications including, for example, hand-held cameras and video recorders, drones, and vehicles. Image capture devices typically include one or more optical elements, e.g., lenses, as well as one or more image sensors, image signal processors, encoders, or combinations thereof to capture and process image data. More specifically, the optical element(s) capture content by receiving and focusing light via, and the captured content is converted to an electronic image signal by the image sensor. The image signal generated by the image sensor is then processed by an image signal processor to form an image, which may be stored and/or encoded.

Each of the optical elements included in an image capture device has an associated field-of-view that extends in lateral and longitudinal directions. Traditionally, the fields of view for image capture devices are altered by changing the lens(es) of the device. Many digital single-lens reflex (DSLR) cameras, for instance, are configured for use with a variety of interchangeable lenses. The one or more lenses, when connected to a camera body, focus light onto the image sensor in different manners to provide the image capture device with different functionality (e.g., different focal lengths). However, in more modern image capture devices, lenses cannot simply be exchanged due to the high degree of precision required in alignment of the lens and the image sensor, which cannot be satisfied by traditional mechanical means. The image sensor and the lens are manufactured separately and, therefore, not precisely calibrated to each other to account for any manufacturing variability. Moreover, each time one of the lenses is removed, the image sensor is exposed to contaminants (e.g., dust, moisture, etc.) that may be detrimental to performance of the image capture device.

SUMMARY

Disclosed herein are implementations of image capture devices having an image capture module and a base module. The image capture module is releasably connectable to the base module. The image capture module may include an integrated image sensor and optical component for capturing image data. The base module may include a processor. The processor may be configured and the base module may be calibrated based on identification data provided by the image capture module when releasably connected to the base module. The image information and identification data may be wirelessly transferred from the image capture module to the base module.

In an implementation, the image capture module is a plurality of image capture modules, where each image capture module may have an integrated image sensor and optical component assembly which has different image sensor properties and optical component properties. Each of these image capture modules being releasably attachable to the base module.

In an implementation, the processor is a system-on-chip, image signal processor, a controller or combinations thereof which are configured for optimal performance based on the identification data provided by the image capture module. In an implementation, the base module may be calibrated based on the identification data provided by the image capture module. In an implementation, a user interface which is configurable based on the identification data.

In an implementation, image information may be captured after processor configuration and base module calibration are complete. In an implementation, an audio or visual signal may be provided to indicate completion.

In an implementation, the identification data may be stored in local storage on the image capture module. In an implementation, the image capture module control information is different for different image capture modules.

In an implementation, the image information and the identification data may be provided using wired techniques, wireless technique, or a combination thereof.

In an implementation, the base module and image capture module have corresponding or complementary mounting structures which are configured and dimensioned for releasable attachment of the image capture module to the base module. In an implementation, the corresponding or complementary mounting structures may provide mechanical coupling and electrical connectivity between the image capture module to the base module. In an implementation, the corresponding or complementary mounting structures may provide bidirectional electrical communication between the base module and the image capturing device.

In an implementation, releasable attachment of the image capture module to the base module uses an interface. The interface may provide mechanical cooperation with the base module and electrical communication between the image capturing module and the base module. In an implementation, the interface may assist in data transfer between the image capture module and the base module.

In an implementation, the image capture module may draw power from the base module, the interface, a power source on the image capture module or a combination thereof.

In an implementation, the image capture module and base module may include environmentally proof housing to protect an image sensor or a processor, respectively.

BRIEF DESCRIPTION OF THE DRAWINGS

The disclosure is best understood from the following detailed description when read in conjunction with the accompanying drawings. It is emphasized that, according to common practice, the various features of the drawings are

DETAILED DESCRIPTION

Figure 1A:
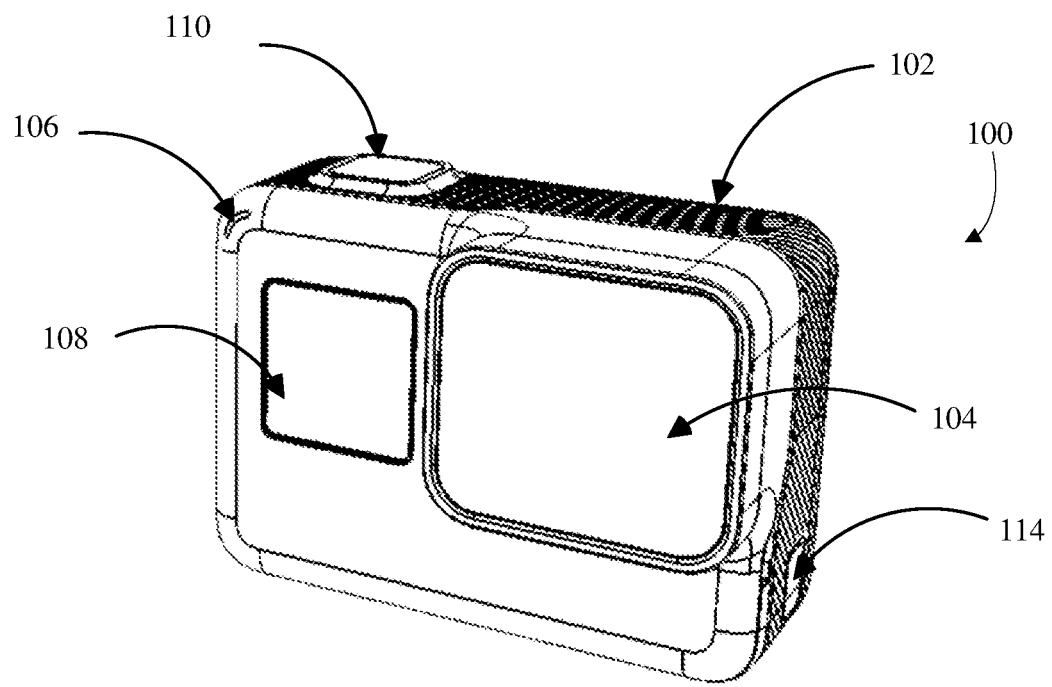
FIGS. 1A-D are isometric views of an example of an image capture device.
Figure 1B:
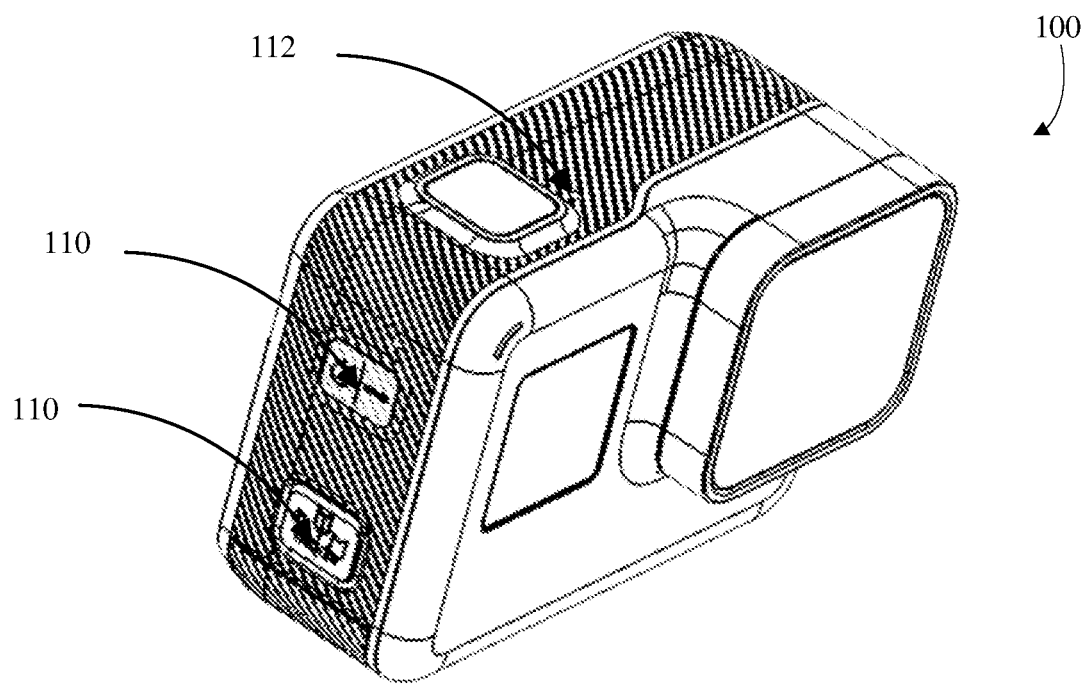
Figure 1C:
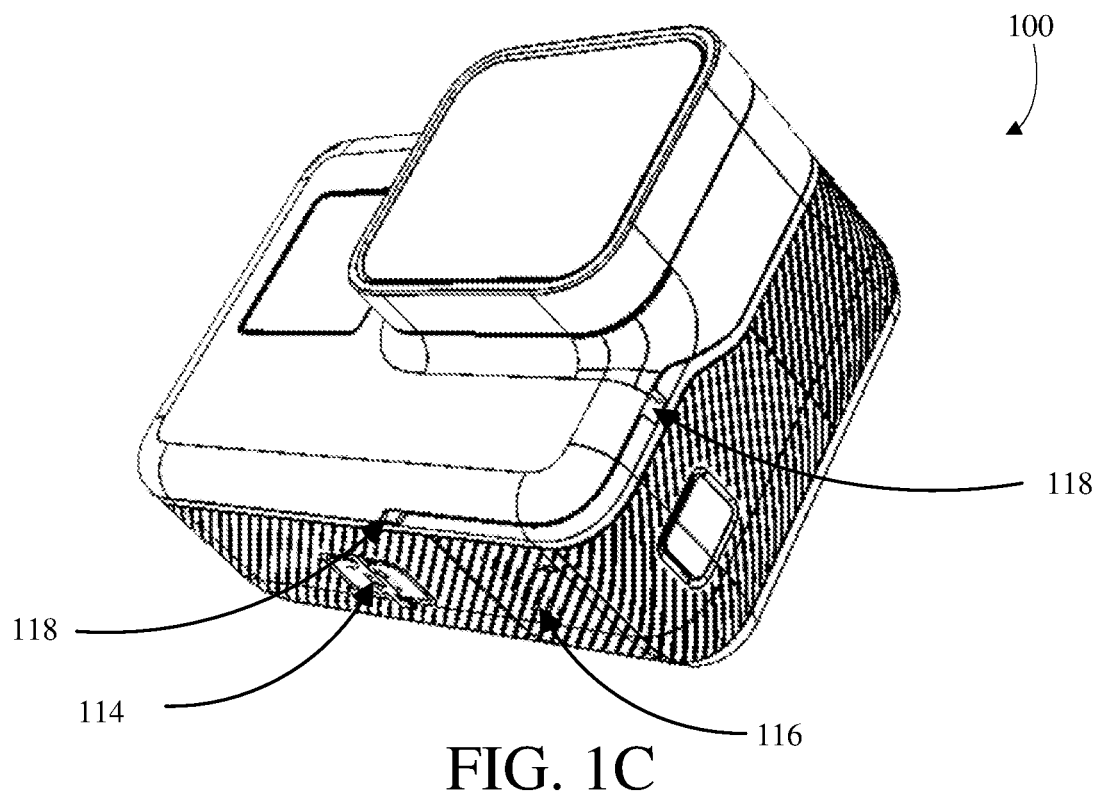
Figure 1D:
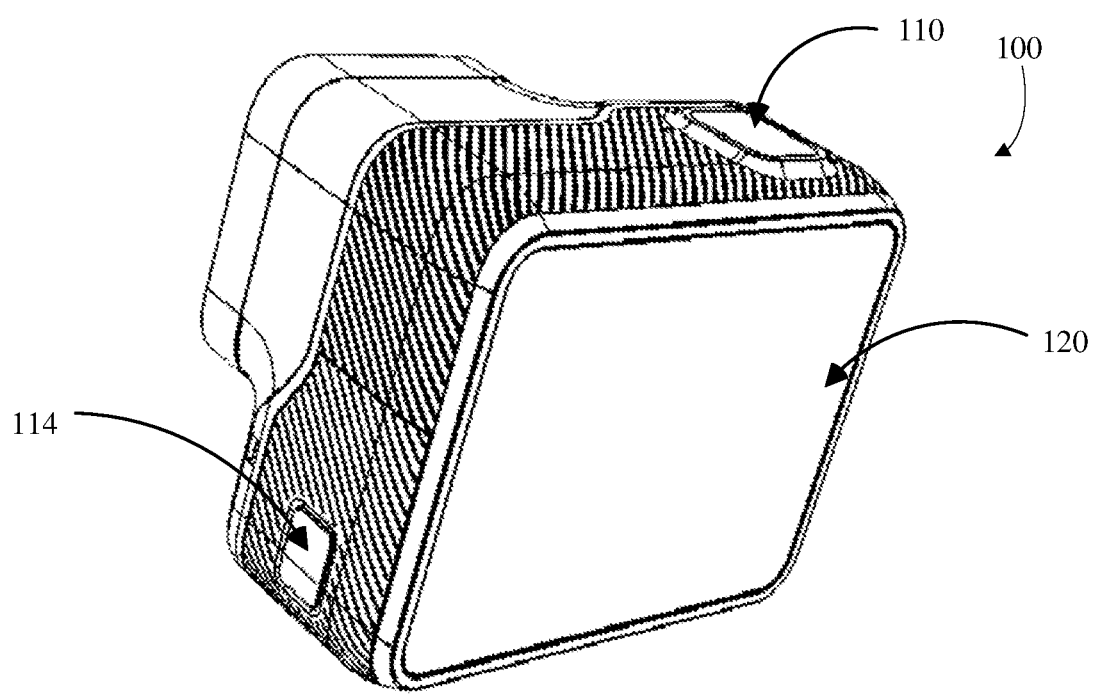

Disclosed herein are embodiments of image capture devices having an image capture module and a base module that are interchangeable. The image capture module includes an integrated image sensor-optical component assembly that may be fixed in relation to a housing of the image capture module. The integrated image sensor-optical component assembly includes an image sensor and an optical component that may be coupled to each other in a precisely determined spatial or fixed arrangement to optimize the image sensor and optical component pairing. In an implementation, the optical component is a lens or multiple lenses. In an implementation, the image sensors in the image capture modules are maintained inside environmentally proof housings, such as for example, waterproof housings. The base module includes a system-on-chip (SoC) that is configurable based on identification provided by the image capture module. The SoC may support multiple image sensor modules, image sensors and the like. In an implementation, the SoC may be configured based on the image sensor, lens, field of view, and other like features or characteristics of the image capture module.

In an implementation, the image capture module and the base module may include mounting structures that may provide releasable mechanical coupling and electrical connectivity. In an implementation, the electrical connectivity may be used to provide power and facilitate the transfer of data between the image capture module and the base module. In an implementation, the data may include image data and identification information from the image capture modules. In an implementation, the data may be transmitted wirelessly between the image capture module and the base module.

Each of the image capture modules may be configured to provide image capture functions differently from each other, such as by having different resolutions, light sensitivities, frame rates, fields of view, and/or fixed or variable focal lengths. As a result, the image capture device may, by coupling different ones of the image capture modules to the base module, provide different image capture functions. Advantageously, a user of the image capture device may thereby be provided with added functionality, improved quality, reduced complexity, and/or reduced cost as compared to other cameras (e.g., the digital point-and-shoot cameras and the single-lens reflex cameras described above).

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LED display 108. The image capture device 100 may also include buttons 110 configured to allow a user of the image capture device 100 to interact with the image capture device 100, to turn the image capture device 100 on, and to otherwise configure the operating mode of the image capture device 100. The image capture device 100 may also include a microphone 112 configured to receive and record audio signals in conjunction with recording video. A side of the image capture device 100 may include an I/O interface 114. The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects the internal electronics which are further described in later sections. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. Additional features, such as the features described above, may be affixed to the exterior. In some embodiments, the image capture device 100 described herein includes features other than those described below. For example, instead of a single interface button, the image capture device 100 may include additional buttons or different interface features, such as multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture device 100 may interface with or communicate with an external device, such as an external user interface device, via a wired or wireless computing communication link (not shown). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
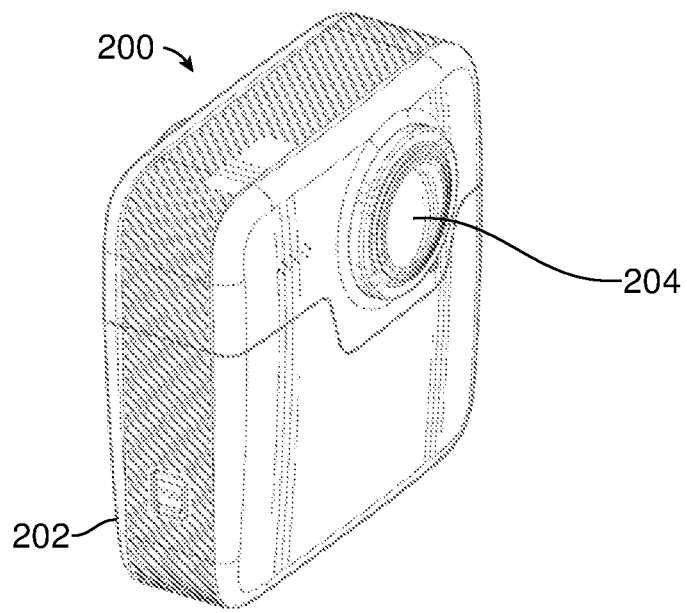
FIGS. 2A-B are isometric views of another example of an image capture device.
Figure 2B:
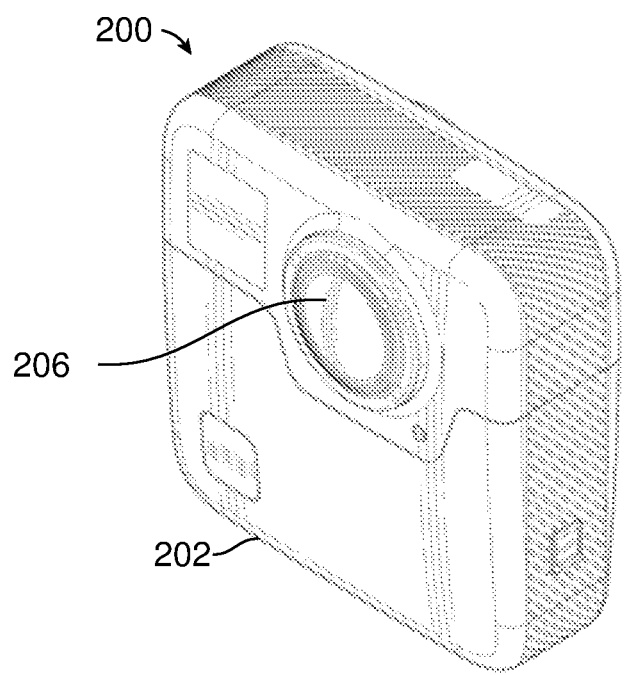

FIGS. 2A-B illustrate an image capture device 200 according to one embodiment. The image capture device 200 comprises a camera body 202 having two camera lenses 204, 206 structured on front and back surfaces of the camera body 202, various indicators on the front and/or back surface of the camera body 202 (such as LEDs, displays, and the like), various input mechanisms (such as buttons, switches, microphones, and touch-screen mechanisms), and electronics (e.g., imaging electronics, power electronics, etc.) internal to the camera body 202 for capturing images via the camera lenses 204, 206 and/or performing other functions. The two lenses 204, 206 are oriented in opposite directions and couple with two images sensors mounted on circuit boards (not shown). Other electrical camera components (e.g., an image processor, camera SoC (system-on-chip), etc.) may also be included on one or more circuit boards within the camera body 202 of the image capture device 200.

Figure 2C:
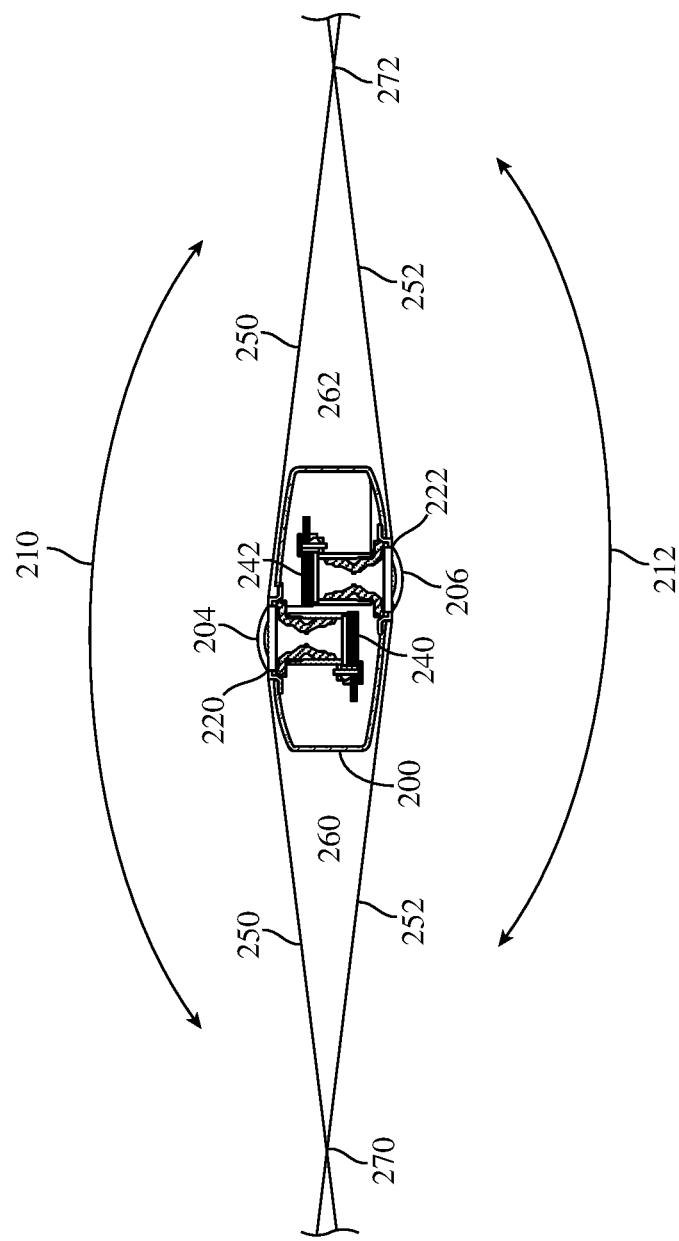
FIG. 2C is a cross-sectional view of the image capture device of FIGS. 2A-B.

FIG. 2C is a cross-sectional view of the image capture device 200 of FIGS. 2A-B. In some implementations, the image capture device 200 may be a spherical image capture device with fields-of-view 210, 212 as shown in FIG. 2C. For example, the image capture device 200 may include image capture devices 220, 222, related components, or a combination thereof, arranged in a back-to-back or Janus configuration. For example, a first image capture device 220 may include the first lens 204 and a first image sensor 240, and a second image capture device 222 may include the second lens 206 and a second image sensor 242 arranged oppositely from the first lens 204 and the first image sensor 240.

The first lens 204 of the image capture device 200 may have the field-of-view 210 shown above a boundary 250. Behind the first lens 204, the first image sensor 240 may capture a first hyper-hemispherical image plane from light entering the first lens 204, corresponding to the first field-of-view 210.

The second lens 206 of the image capture device 200 may have a field-of-view 212 as shown below a boundary 252. Behind the second lens 206, the second image sensor 242 may capture a second hyper-hemispherical image plane from light entering the second lens 206, corresponding to the second field-of-view 212.

One or more areas, such as blind spots 260, 262, may be outside of the fields-of-view 210, 212 of the lenses 204, 206, light may be obscured from the lenses 204, 206 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 204, 206, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A slight change in the alignment, such as position and/or tilt, of the lenses 204, 206, the image sensors 240, 242, or both, may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 204, 206 and the image sensors 240, 242 such that the fields-of-view 210, 212, stitch points 270, 272, or both may be accurately determined, which may improve the accuracy, efficiency, or both of generating a combined image.

Optical axes through the lenses 204, 206 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 204, 206, such that the image sensors may be perpendicular to the respective axes to within a tolerance such as 1%, 3%, 5%, 10%, and/or other tolerances.

The lenses 204, 206 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 204, 206 may include substantially reduced thickness relative to the lengths of the lens barrels securing the lenses 204, 206. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 210, 212.

Images or frames captured by an image capture device, such as the image capture device 100 shown in FIGS. 1A-D or the image capture device 200 shown in FIGS. 2A-C, may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figures 3A, 3B:
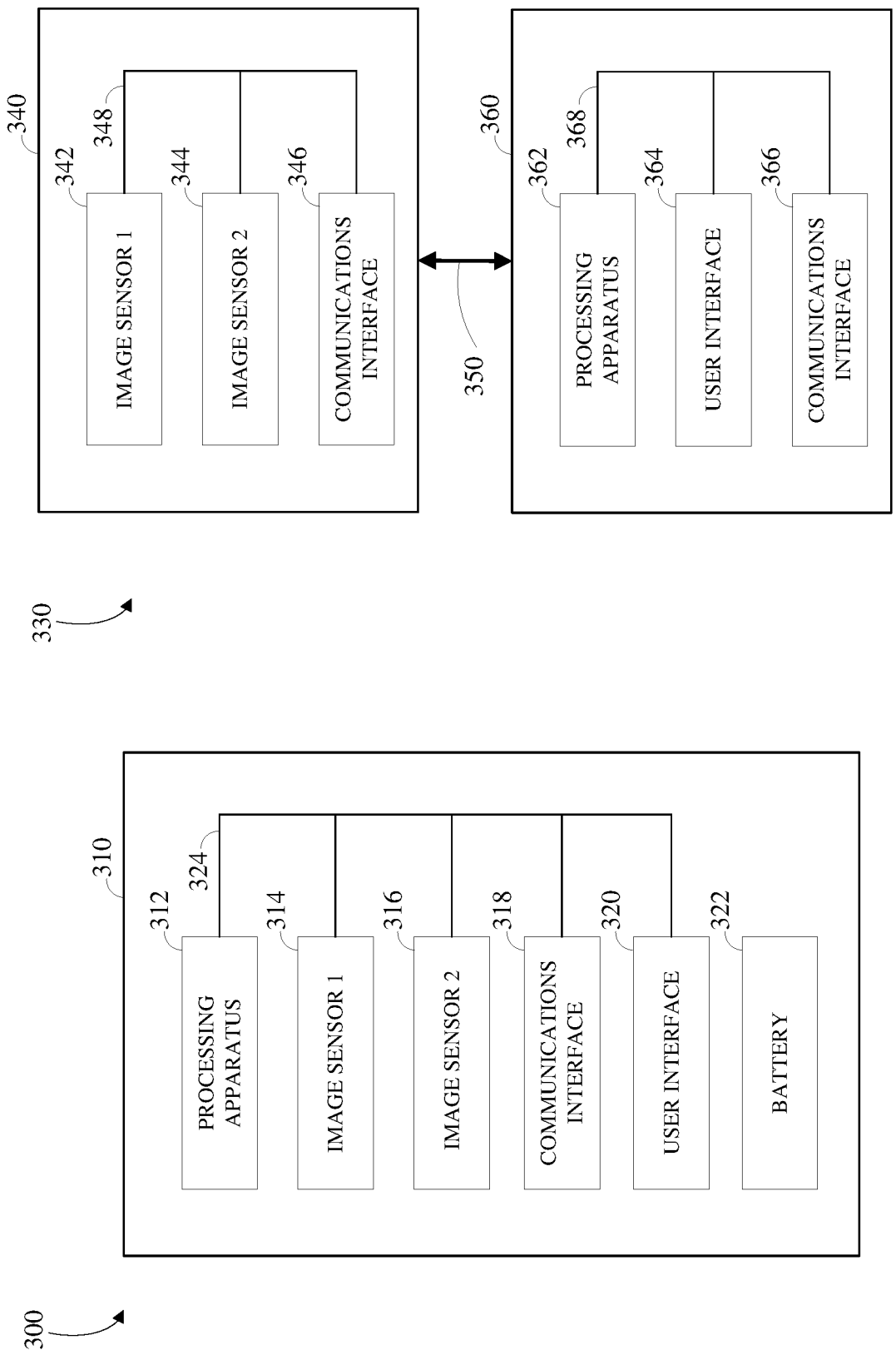
FIGS. 3A-B are block diagrams of examples of image capture systems.

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 100 shown in FIGS. 1A-D or the image capture device 200 shown in FIGS. 2A-B.

The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may be modular using the implementations described in this disclosure, such as the embodiments and implementations described in FIGS. 6-19.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D or the image capture device 200 shown in FIGS. 2A-C. The personal computing device 360 may, for example, be the user interface device described with respect to FIGS. 1A-D.

The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor 342 and a second image from the second image sensor 344. The processing apparatus 362 may be configured to perform image signal processing (e.g., filtering, tone mapping, stitching, and/or encoding) to generate output images based on image data from the image sensors 342, 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via a bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or snap photograph) received via the user interface 364 may be passed on to the image capture device 340 via the communications link 350.

The image capture system 340 may be modular using the implementations described in this disclosure, such as the embodiments and implementations described in FIGS. 6-19.

Figure 5:
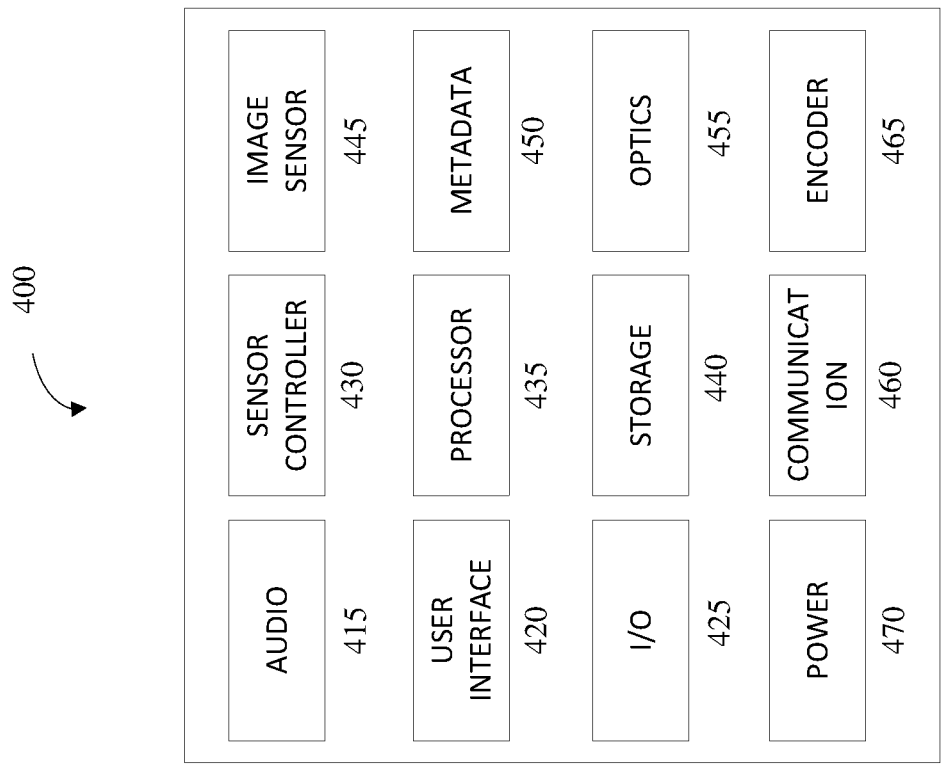
FIG. 5 is a schematic representation of an image capture device.
Figure 4:
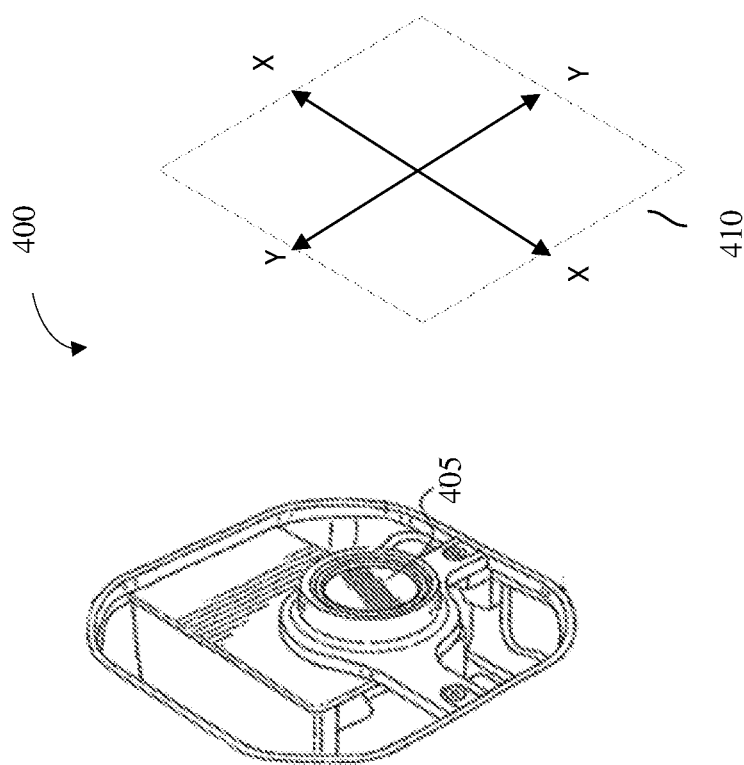
FIG. 4 is a perspective view of another example an image capture device together with an associated field-of-view.

FIG. 4 is a perspective view of another example an image capture device 400 together with an associated field-of-view and FIG. 5 is a schematic representation of the image capture device 400. The image capture device 400 includes one or more optical components or elements 405 with an associated field-of-view 410 that extends, for example, 90° in a lateral dimension X-X and 120° in a longitudinal dimension Y-Y. Dependent upon the capabilities of the particular optical component(s) 405, however, the extent of the field-of-view 410 may be varied (i.e., increased or decreased) in the lateral dimension or the longitudinal dimension. Suitable optical component(s) 405 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, and perspective control lenses. In some image capture devices, multiple, overlapping fields of view are employed to increases the capability of the device, for example, by including two or more optical elements. For example, a first fisheye image may be a round or elliptical image, and may be transformed into a first rectangular image; a second fisheye image may be a round or elliptical image, and may be transformed into a second rectangular image; and the first and second rectangular images may be arranged side-by-side, which may include overlapping, and stitched together to form the equirectangular planar image.

As seen in FIG. 4 in addition to the optical component(s) 405, the image capture device 400 may further include an audio component 415, a user interface (UI) unit 420, an input/output (I/O) unit 425, a sensor controller 430, a processor 435, an electronic storage unit 440, an image sensor 445, a metadata unit 450, an optics unit 455, a communication unit 460, an encoder 465, and power system 470. Suitable examples of the image sensor 445 may include a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

During the processing of images, it is envisioned that the processor 435 may identify motion information, such as motion vectors, representing motion between the respective images and reference data. For example, the processor 435 may perform motion estimation to generate the motion information. The processor 435 may then output the processed images, for example, to a memory of the image capture device 400 for storage.

The image capture device 400 may be modular using the implementations described in this disclosure, such as the embodiments and implementations described in FIGS. 6-19.

Figure 6:
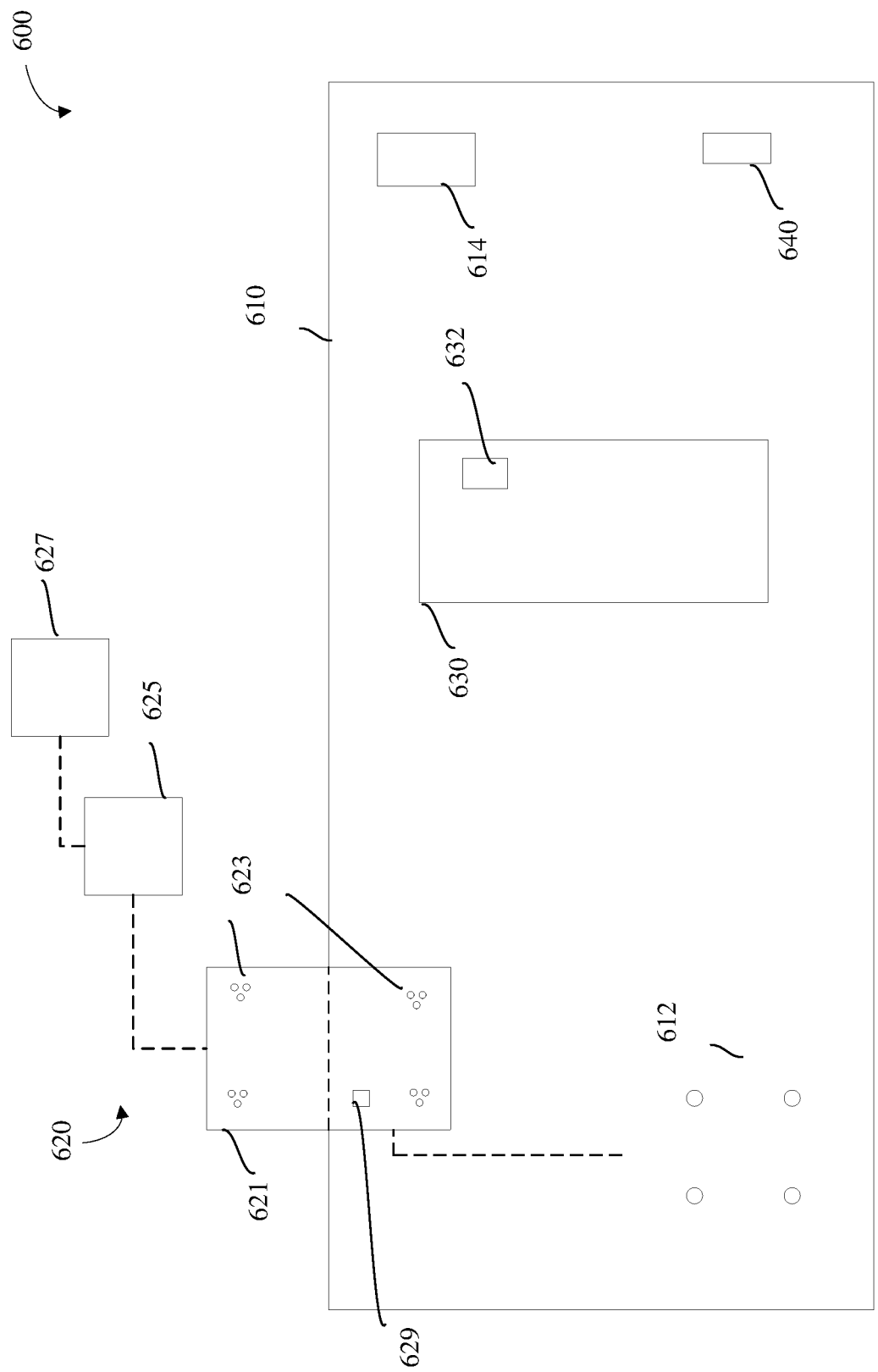
FIG. 6 is a schematic representation of an example of an image capture device including an integrated sensor-optical component assembly in accordance with embodiments of this disclosure.

FIG. 6 is a schematic representation of an example of an image capture device 600 including an integrated sensor-optical component assembly in accordance with embodiments of this disclosure. The image capture device 600 includes a base module 610, sometimes referred to as a base module, an image capture module 620, an interface 630, and a system-on-chip (SoC) 640.

The base module 610 may include mounting structure 612, such as, for example, mechanical clips, a detent assembly, slots, or the like that receive corresponding structure included on the image capture module 620. The mounting structure 612 may facilitate the use of a variety of image capture modules 620.

The image capture module 620 may include a body 621 with engagement structures 623 that are configured and dimensioned to correspond with the mounting structure 612 included on the base module 610 of the image capture device 600. The image capture module 620 may further include one or more sensors 626 (e.g., any of the aforementioned image sensors), and one or more optical components 627 (e.g., any of the aforementioned optical component(s), lens(es) and the like). The one or more sensors 626 and the one or more optical components 627 may form an integrated sensor-optical component assembly of the image capture module 620. Although shown as including a single sensor 625 and a single optical element 627 in the embodiment shown in FIG. 6, in alternate embodiments, the number of included sensors 625 and optical components 627 may be varied without departing from the scope of the present disclosure.

Several factors may need to be considered for proper alignment of the sensor 625 and the optical component 627. These factors may include the distance between the optical component 627 and the sensor 625, the tip-tilt of the optical component 627 in relation to the sensor 625, and the centration of the optical component 627 with respect to the sensor 625. For example, regarding the distance between the optical component 627 and the sensor 625, accuracy to within microns may be required. Additionally, with respect to tip-tilt, it may be desirable to arrange the optical component 627 in perpendicular relation to the sensor 627 to within fractions of a degree. Given this high degree of precision, alignment may be optimized at the manufacturing stage to ensure that the integrated sensor-optical component assembly is in constant focus (i.e., that the distance, tip-tilt, and centration are proper at all times). Specifically, during assembly, targets may be tracked within a field-of-view of the optical component 627 and the optical component 627 can then be repositioned relative to the sensor 625. This process can be repeated until it is determined that proper alignment between the optical component 627 and the sensor 625 has been achieved. The optical component 627 may then be fixed relative to the sensor 625. For example, an optical component mount (not shown) may be glued to the sensor 625 in order to preserve alignment. An offset may be also implemented to account for normal heating and cooling of the adhesive, the optical component 627 and the like.

The interface 630 may be configured and dimensioned for mechanical connection to the base module 610 of the image capture device 600. The interface 630 may also be adapted for electrical connection and signal communication between the base module 610 and the image capture module 620 to facilitate the transfer of data and/or power between the base module 610 and the image capture module 620. In an implementation, the interface 630 may a mounting structure that is configured and dimensioned for engagement/disengagement with the base module 610 mounting structure to facilitate attachment/de-attachment of the at least one image capture module 620 to the base module 610.

In an implementation, the image capture module 620 may draw power from the base module 610, for example, from a power source 614, such as a battery. This power connection may be facilitated by the electrical connection established by the interface 630. In an implementation, the image capture module 620 may draw power from an alternate power source 626 included on the image capture module 620, e.g., one or more separate batteries. In an implementation the image capture module 620 may draw power from a power source 632 included on the interface 630. In an implementation, the image capture module 620 may draw power from a combination of the above implementations or power sources.

In an implementation, data is communicated between the image capture module 620 and the base module 610 when the image capture module 620 and the base module 610 are connected. In an implementation, the image capture module 620 and the base module 610 are physically connected. In an implementation, the data transfer may be bi-directional. The data may include image capture module identification data or information, changes in shutter speed, exposure, and the like. In an implementation, the volume of data flowing from the image capture module 620 to the base module 610 may exceed the volume of data flowing from the base module 610 to the image capture module 620.

In an implementation, the SoC 640 may be adapted and programmed to support multiple image capture modules 620 and product uses, such as, for example, hand-held applications, drone-based applications, and/or vehicle-based applications. The SoC 640 may be configured for use with a variety of image capture module 620. Each image capture module 620 may include specific identification data or identifiers that may be communicated to the SoC 600. The identification data may provide information concerning particular fields of view of specific optical components, image sensors and the like. Once the image capture module 620 is identified and processed by the SoC 640, the SoC 640 may execute a self-calibration based on the identification data. The base module 610 and the SoC 640 may be configured or loaded with multiple firmware sets to facilitate the calibration process.

Figure 7:
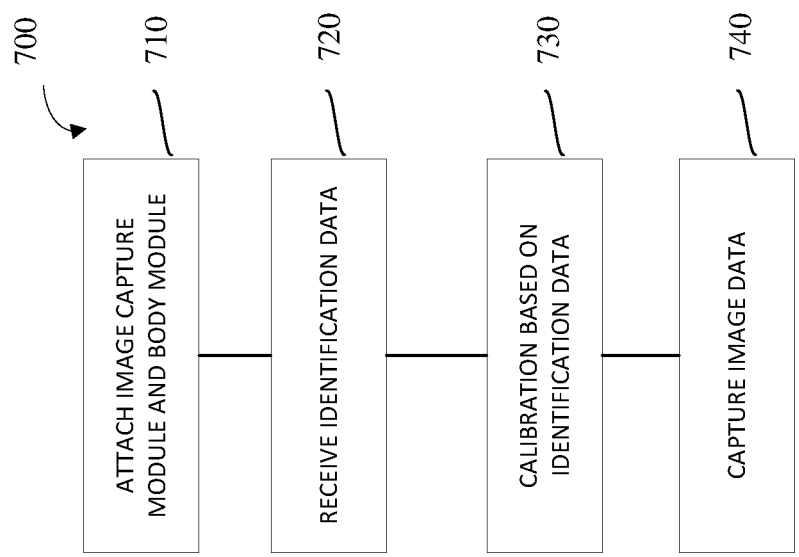
FIG. 7 is a flow diagram of an example method for calibrating an image capture device including an integrated sensor-optical component assembly in accordance with embodiments of this disclosure.

FIG. 7 is a flow diagram of an example method 700 for calibrating an image capture device including an integrated sensor-optical component assembly in accordance with embodiments of this disclosure. The method 700 includes: attaching 710 an image capture module with a base module; receiving 720 image capture module identification data by a SoC on the base module; calibrating 730 the SoC based on the received image capture module identification data; and receiving 740 data from the image capture module after calibration is complete.

The method 700 includes attaching 710 an image capture module with a base module. In an implementation, attachment may include mechanical coupling and electrical connectivity between the image capture module and the base module. In an implementation, attachment may include mechanical coupling and electrical connectivity between the image capture module, an interface module and the base module. In an implementation, attachment may include engaging mounting structure on the base module with the engagement structure included on the image capture module.

The method 700 includes receiving 720 image capture module identification data by a SoC on the base module. In an implementation, the SoC may receive identification data from an integrated sensor-optical component assembly, the sensor or from other components of the image capture module.

The method 700 includes calibrating 730 the SoC based on the received image capture module identification data. In an implementation, the SoC may process the identification data and configure the SoC and the base module for operation or optimal operation with the attached image capture module and the integrated sensor-optical component assembly. In an implementation, a controller on the image capture module may be configured for operation or optimal operation between the image capture module and base module. In an implementation, an image signal processor on the image capture module may be configured for operation or optimal operation between the image capture module and base module. In an implementation, a user interface on the image capture module may be configured for operation between the image capture module and base module.

The method 700 includes receiving 740 data from the image capture module after calibration is complete. In an implementation, the SoC may signal, for example via an audio or visual signal, that calibration is complete and the image capture device is now ready to use.

Figure 8:
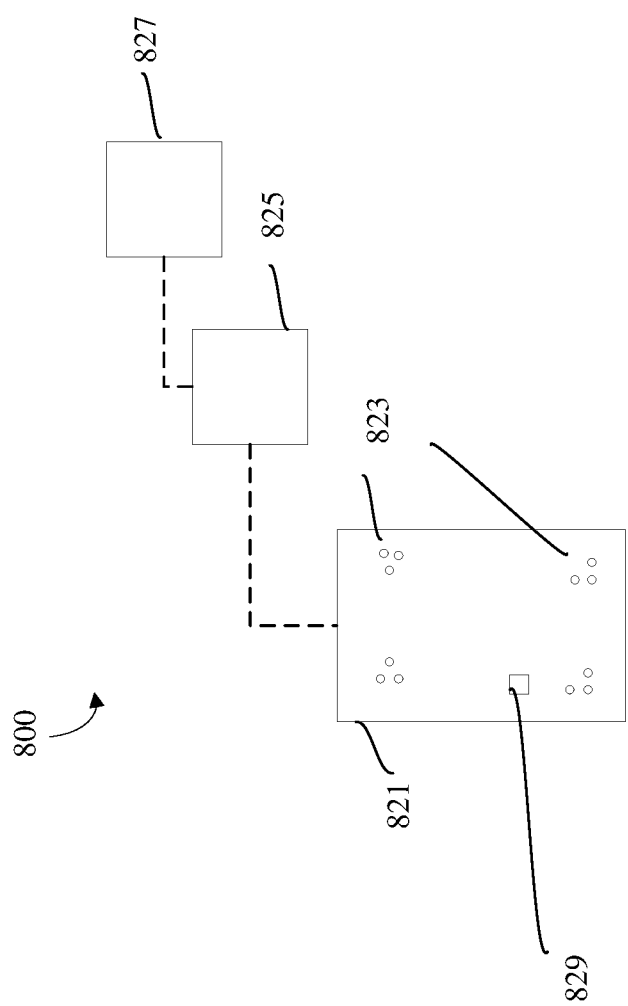
FIG. 8 is a schematic representation of an example of another embodiment of an integrated sensor-optical component assembly in accordance with embodiments of this disclosure.

FIG. 8 is a schematic representation of an example of another embodiment of an image capture module 800 in accordance with embodiments of this disclosure. The image capture module 800 may be adapted for attachment to and de-attachment from a base module (not shown) as described herein.

The image capture module 800 may include a body 821, one or more sensors 825 and one or more optical components 827. In an implementation, the one or more sensors 825 and one or more optical components 827 may be an integrated sensor-optical component assembly. The body 821 may include engagement structures 823 that are configured and dimensioned in correspondence with a mounting structure on a base module, the one or more sensors 825 and the one or more optical elements 827. In this implementation, the optical component 827 may be configured as a first lens having a first field of view and may be configured as a second lens having a second, different field-of-view, such as, for example, a panoramic field-of-view.

Figure 9:
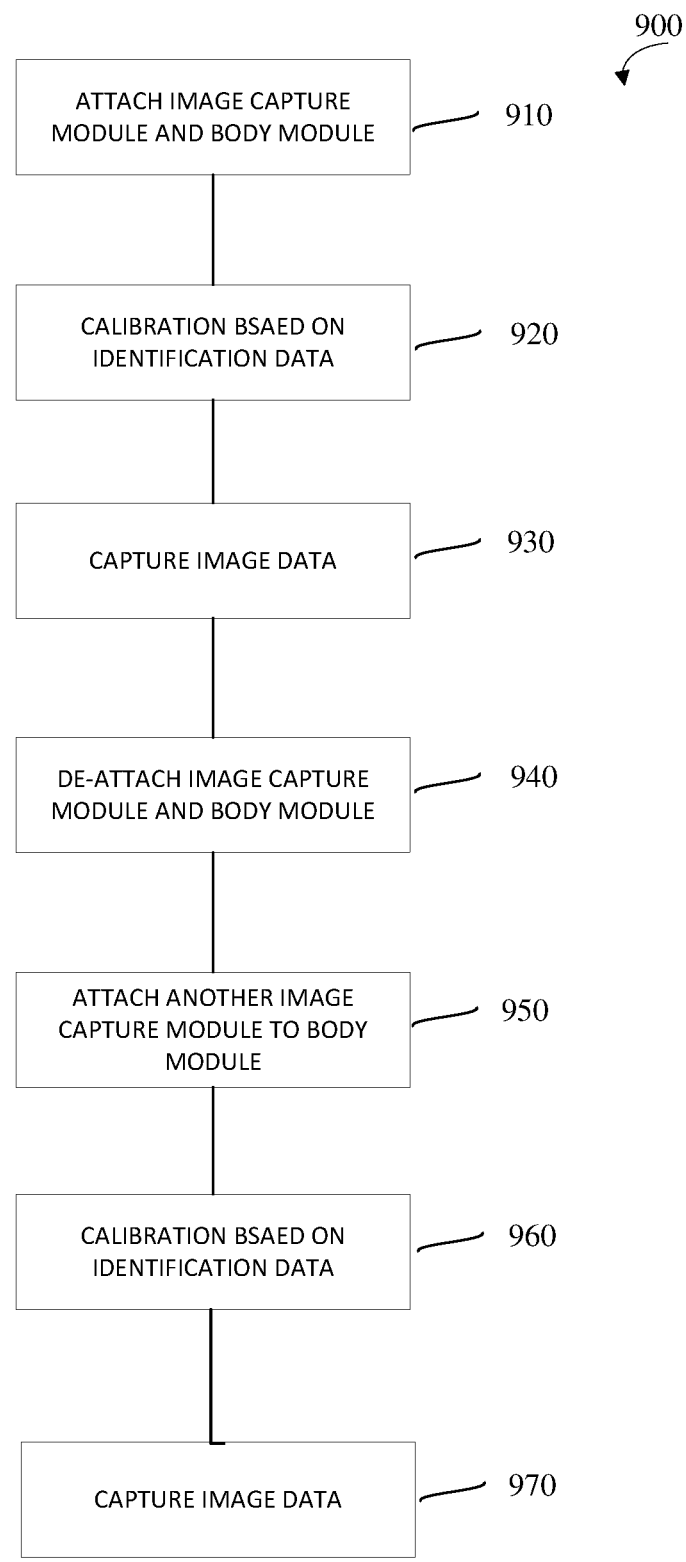
FIG. 9 is a flow diagram of an example method for using an image capture device including an integrated sensor-optical component assembly in accordance with embodiments of this disclosure.

FIG. 9 is a flow diagram of an example method 900 for using an image capture device including an integrated sensor-optical component assembly in accordance with embodiments of this disclosure. The method 900 includes: attaching 910 a first image capture module to a base module; calibrating 920 a base module based on identification data; capturing 930 a first image with the first image capture module; de-attaching 940 the first image capture module; attaching 950 a second image capture module to the base module; calibrating 960 the base module based on identification data; and capturing 970 a second image with the second image capture module.

The method 900 includes attaching 910 a first image capture module to a base module. In an implementation, attachment may include mechanical coupling and electrical connectivity between the image capture module and the base module. In an implementation, attachment may include mechanical coupling and electrical connectivity between the image capture module, an interface module and the base module. In an implementation, attachment may include engaging mounting structure on the base module with the engagement structure included on the image capture module. In an implementation, the image capture module may be pre-attached.

The method 900 includes calibrating 920 a base module based on identification data. In an implementation, the calibrating 920 includes receiving image capture module identification data by a SoC on the base module. In an implementation, the SoC may receive identification data from an integrated sensor-optical component assembly, the sensor or from other components of the image capture module. In an implementation, the SoC may process the identification data and configure the SoC and the base module for optimal operation with the attached image capture module and the integrated sensor-optical component assembly. In an implementation, an image signal processor on the image capture module may be configured for operation or optimal operation between the image capture module and base module. In an implementation, a user interface on the image capture module may be configured for operation between the image capture module and base module.

The method 900 includes capturing 930 a first image with the first image capture module. In an implementation, the image may be captured by the integrated sensor-optical component assembly. The method 900 may include receiving data from the image capture module after calibration is complete. In an implementation, the SoC may signal, for example via an audio or visual signal, that calibration is complete and the image capture device is now ready to use.

The method 900 includes de-attaching 940 the first image capture module. In an implementation, de-attachment may include disengagement of the mounting structure and the engagement structure.

The method 900 includes attaching 950 a second image capture module to the base module. In an implementation, attachment may include mechanical coupling and electrical connectivity between the image capture module and the base module. In an implementation, attachment may include mechanical coupling and electrical connectivity between the image capture module, an interface module and the base module. In an implementation, attachment may include engaging mounting structure on the base module with the engagement structure included on the image capture module.

The method 900 includes calibrating 960 the base module based on identification data. In an implementation, the image may be captured by the integrated sensor-optical component assembly. In an implementation, the calibrating 950 includes receiving image capture module identification data by a SoC on the base module. In an implementation, the SoC may receive identification data from an integrated sensor-optical component assembly, the sensor or from other components of the image capture module. In an implementation, the SoC may process the identification data and configure the SoC and the base module for optimal operation with the attached image capture module and the integrated sensor-optical component assembly. In an implementation, an image signal processor on the image capture module may be configured for operation or optimal operation between the image capture module and base module. In an implementation, a user interface on the image capture module may be configured for operation between the image capture module and base module.

The method 900 includes capturing 970 a second image with the second image capture module. The method 900 may include receiving data from the image capture module after calibration is complete. In an implementation, the SoC may signal, for example via an audio or visual signal, that calibration is complete and the image capture device is now ready to use.

Figure 10:
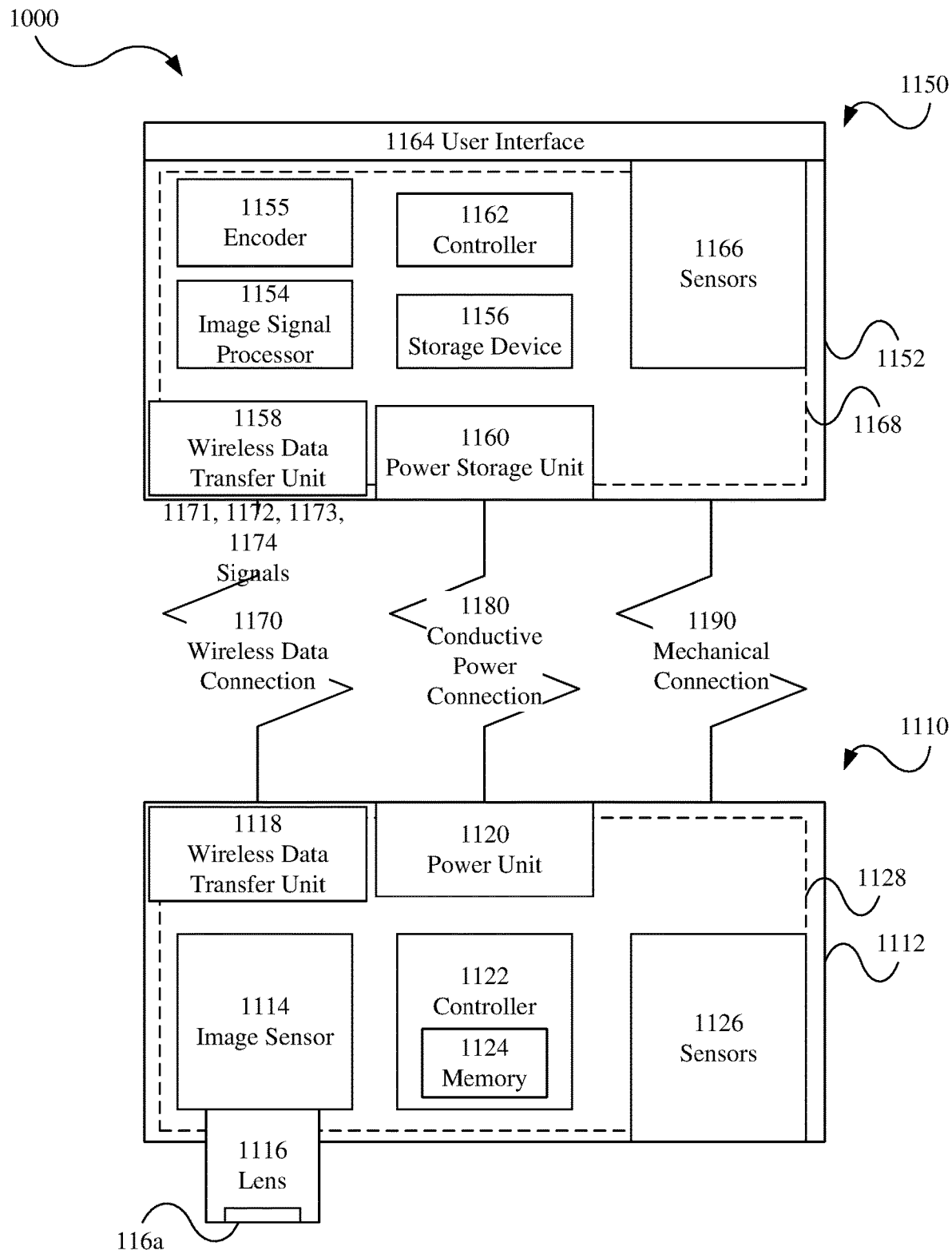
FIG. 10 is a schematic of an example of another image capture device including an integrated sensor-optical component assembly in accordance with embodiments of this disclosure.

FIG. 10 is a schematic of an example of another image capture device 1000 including an integrated sensor-optical component assembly in accordance with embodiments of this disclosure. The image capture device 1000 generally includes one or more image capture modules 1110 and a base module 1150. Each of the one or more image capture modules 1110 provides various image capture functions, such as image sensing and light focusing. The base module 1150 may provide various general functions, such as providing a SoC, a user interface, power storage and delivery, and data storage. The one or more image capture modules 110 are each interchangeably coupleable to the base module 1150, such that each of the image capture modules 1110 may be repeatedly coupled to and removed from the base module 1150. The image capture module 1110 may also be referred to as or include an image capture assembly, an image capture unit, a sensor/lens module, sensor/lens assembly, a sensor/lens unit or an integrated sensor-optical component assembly. The base module 1150 may also be referred to as a base assembly, a base unit, a body module, a body assembly a body unit, or a camera body unit. The image capture device 1000 may also be referred to as a modular camera system, a video camera system, or a modular video camera system.

Each of the image capture modules 1110 may be configured to provide image capture functions differently from each other, such as by having different resolutions, light sensitivities, frame rates, fields of view, and/or fixed or variable focal lengths. As a result, the image capture device 1000 may, by coupling different ones of the image capture modules 1110 to the base module 1150, provide different image capture functions. Advantageously, a user of the image capture device 1000 may thereby be provided with added functionality, improved quality, reduced complexity, and/or reduced cost as compared to other cameras (e.g., the digital point-and-shoot cameras and the single-lens reflex cameras described above).

As referenced above, the image capture module 1110 is interchangeably coupleable to the base module 1150. In an implementation, the image capture module 1110 is interchangeably coupleable to the base module 1150 via a wireless data connection 1170, a conductive power connection 1180, and a mechanical connection 1190. The mechanical connection 1190 mechanically connects the image capture module 1110 to the base module 1150 to prevent physical separation therebetween, for example, by holding the image capture module 1110 in a predetermined spatial relationship relative to the base module 1150. The wireless data connection 1170 provides wireless data transfer, such as transfer of image information (e.g., images frames of a video stream) from the image capture module 1110 to the base module 1150. For example, the image information may include includes image frames having 4K resolution or more and captured at 30 frames per second or more.

As discussed in further detail below, the wireless data connection 1170 may be a close proximity, high speed data transfer system that provides data transmission without physical contact between wireless data transfer devices thereof. The conductive power connection 1180 transfers electrical power to the image capture module 1110 from the base module 1150 via physical contact between conductive members, which is then used to power various electrical components of the image capture module 1110. The wireless data connection 1170 may also be referred to as a data connection, a wireless data link, a data link, a wireless data coupling, or a data coupling. The conductive power connection 1180 may also be referred to as a power connection, a conductive power link, a power link, a conductive power coupling, or a power coupling. The mechanical connection 1910 may also be referred to as a physical connection, a mechanical coupling, or a physical coupling. The image capture module 1110 and variations thereof, the base module 1150, the wireless data connection 1170, the conductive power connection 1180, and the mechanical connection 1190 are discussed in further detail below. In some embodiments, a wired data connection may be provided instead of or in addition to the wireless data connection 1170, for example, to transfer subsets or particular types of data (e.g., control instructions). Instead of or in addition to the conductive power connection 1180, a wireless power connection may be provided (e.g., inductive power transfer).

Figure 11:
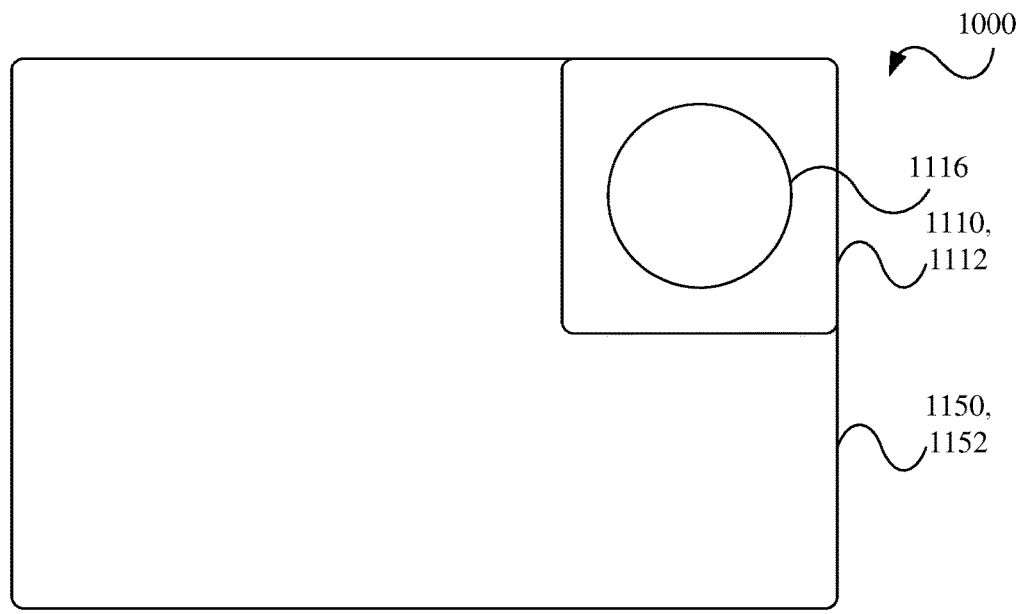
FIG. 11 is a front view of the example image capture device of FIG. 10 in an assembled state in accordance with embodiments of this disclosure.
Figure 12:
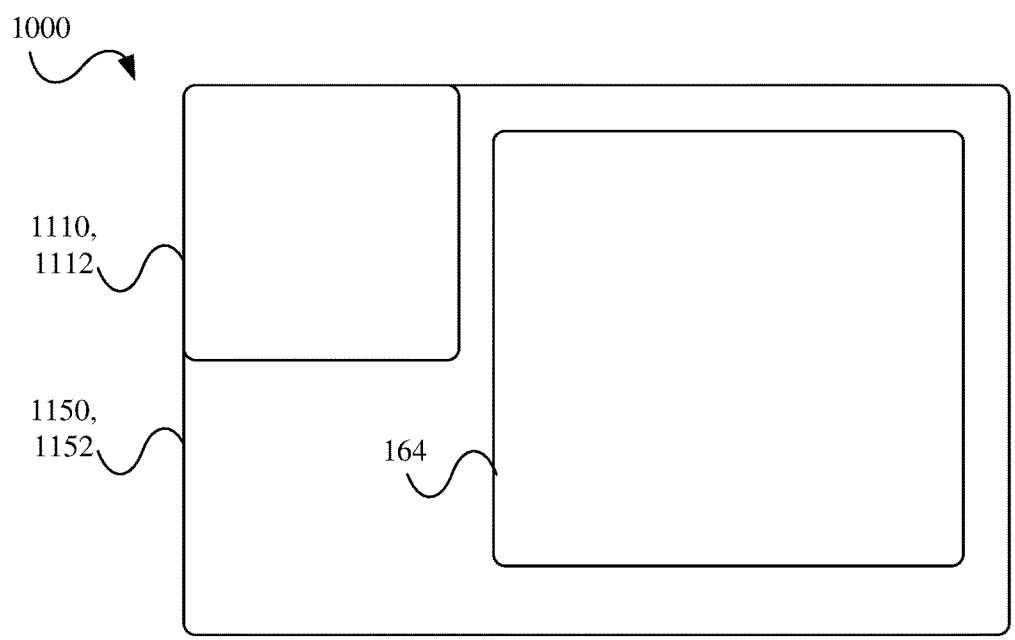
FIG. 12 is a rear view of the example image capture device of FIG. 10 in an assembled state in accordance with embodiments of this disclosure.
Figure 14:
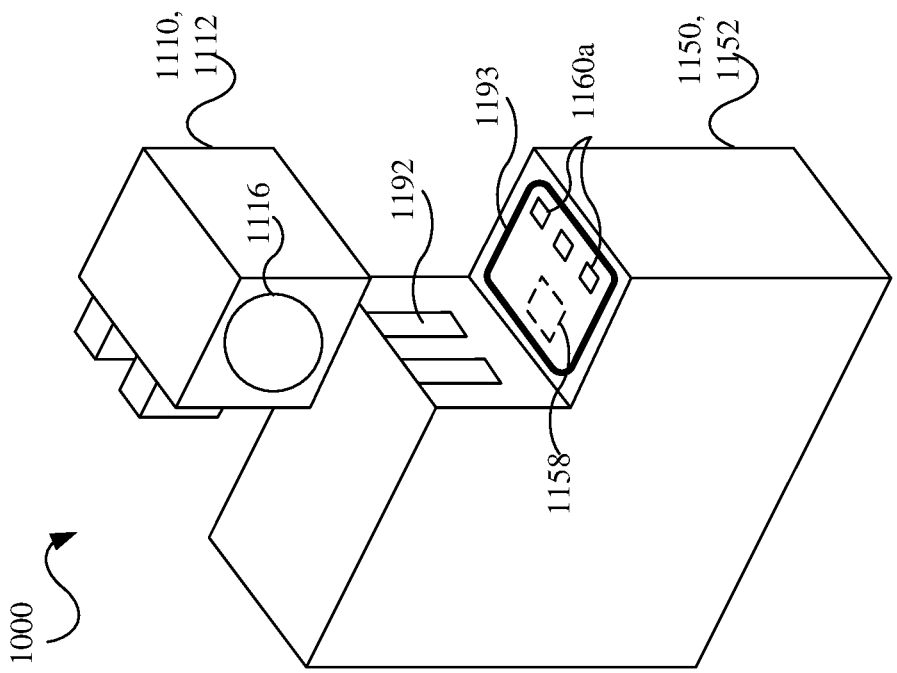
FIG. 14 is a rear, lower, left perspective view of the example image capture device of FIG. 10 in the disassembled stated.
Figure 13:
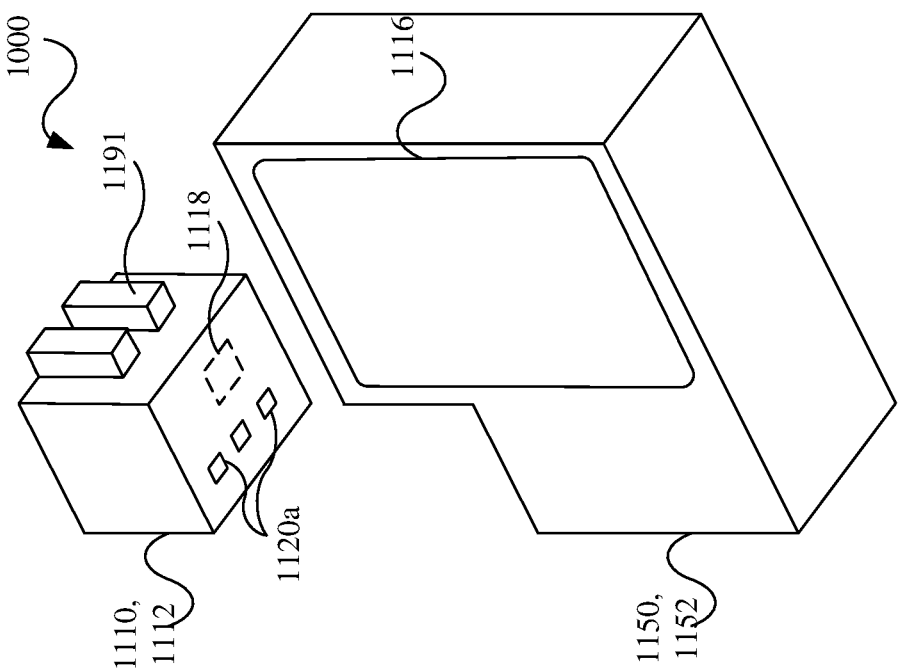
FIG. 13 is a front, upper, right perspective view of the example image capture device of FIG. 10 in a disassembled state.

Still referring to FIG. 10 and now also to FIG. 11, which is a front view of the example image capture device of FIG. 10 in an assembled state in accordance with embodiments of this disclosure, FIG. 12, which is a rear view of the example image capture device of FIG. 10 in an assembled state in accordance with embodiments of this disclosure, FIG. 13, which is a front, upper, right perspective view of the example image capture device of FIG. 10 in a disassembled state, and FIG. 14, which is a rear, lower, left perspective view of the example image capture device of FIG. 10 in the disassembled stated, the image capture module 1110 generally includes a housing 1112, an image sensor 1114, and a lens 1116. The image capture module 1110 may additionally include one or more of a wireless data transfer device 1118, a power unit 1120, a controller 1122, or a non-volatile memory 1124. The image capture module 1110 may further include additional sensors 1126, such as one or more audio sensors (e.g., microphones), one or more motion sensors (e.g., gyroscope, inertia measurement unit (IMU)), and one or more position or orientation sensors (e.g., altimeter, global positioning (GPS), magnetometer or compass), which collect sensor information. The lens 1116 may also be referred to as a lens assembly, a lens unit or an optical component. The wireless data transfer device 1118 may also be referred to as a wireless data transfer unit, a wireless data transmission unit, a wireless data transmitter or transceiver, or a wireless transmitter or transceiver. The power unit 1120 may also be referred to as a power device, an electrical power unit, or an electrical power device.

The various electrical components of the image capture module 1110, such as the image sensor 1114, the wireless data transfer device 1118, the power unit 1120, and the controller 1122, or subcomponents thereof, may be mounted (e.g., physically and/or functionally connected) to a printed circuit board 1128 (e.g., PCB) located in the housing 1112.

The housing 1112 defines one or more cavities in which the various electrical components are positioned. The housing 1112 is configured to prevent contaminants, such as dust or water, from reaching the image sensor 1114 and other electrical components contained therein, for example, by satisfying one or more ingress protection standards published by the International Electrotechnical Commission (e.g., IP67). The housing 1112 may be considered waterproof.

The image sensor 1114 is configured to detect light of a certain spectrum (e.g., the visible spectrum or the infrared spectrum) and convey image information constituting an image as electrical signals (e.g., analog or digital signals). These electrical signals that convey image information may be referred to as image signals 1171, raw image signals, or pre-processed image signals. The image signal 1171 may, for example, be an RGB signal. The image sensor 1114 may be a charge-coupled device (CCD) or complementary metal-oxide-semiconductor (CMOS) type of image sensor.

The image sensor 1114 may have (e.g., be configured with) primary image sensor characteristics that include type (e.g., CCD or CMOS), resolution (e.g., number of pixels), light spectrum (e.g., wavelengths of detectable light), speed (e.g., frame rate), power consumption, and number of image sensors 1114. As a result, different ones of the image capture modules 1110 may have different characteristics, which may be advantageous for different customers (e.g., lower price point for image capture modules 1110 providing lower quality and/or fewer features) and different use cases (e.g., need for highly detailed images, light conditions, high frame rate requirements, duration of use, monocular view, stereoscopic view, or large field of view). In an implementation, these characteristics may be sent as or part of the identification data as described herein.

The lens 1116 is configured to direct (e.g., focus) light from outside the cavity 1112a of the housing 1112 onto the image sensor 1114. The lens 1116 may be formed as a lens element 1116a made of suitable material (e.g., glass or polymer) and configured for focusing light onto the image sensor 1114. The lens 1116 may also be configured as an assembly that, for example, includes multiple lens elements 1116a that direct light to a single image sensor 1114, a mechanical support (e.g., a bezel that supports the lens element 1116a), one or more filters, one or more covers, etc. The lens 1116 may also be configured as an operable mechanism that includes an operator (e.g., an electric motor) for operation thereof (e.g., moving the lens element 1116a to provide different focal lengths and/or for focusing). The lens 1116 may have (e.g., be configured with) primary lens characteristics that include quality or type of material, field of view, a fixed focal length, or a range of focal lengths (e.g., zoom). The lens 1116 may also include multiple lens elements 1116a that direct light to multiple image sensors 1114 of the image capture module 1110 (e.g., to provide stereoscopic imaging or increased fields of view whereby image information from the multiple image sensors 1114 is stitched together), or the image capture module 1110 may include multiple lenses 1116 that are each associated with one of multiple image sensors (e.g., each being associated with one of multiple image sensors 1114), or the image capture module 1110 may include more than one lens 1116 (e.g., each being associated with one or more of multiple image sensors 1114). Each of these may be referred to as an integrated sensor-optical component assembly.

Moving ahead to FIGS. 7-11, variations of the image capture module 1110 are illustrated with different image sensors and different lens combinations. The image capture module 1110 may, for example, include a single image sensor 1114 having a high resolution (e.g., 4K) and speed (e.g., capable of 30 fps or 60 fps) and a single lens 1116 having a fixed focal length.

Figure 16:
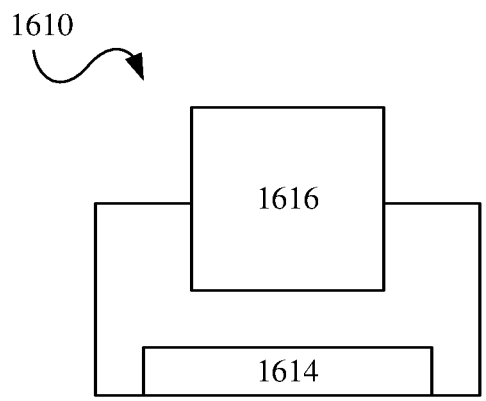
FIG. 16 is a top schematic view of an example of another image capture module in an image capture device including an integrated sensor-optical component assembly.

FIG. 16 is a top schematic view of an example of another image capture module 1610 in an image capture device including an integrated sensor-optical component assembly. Then image capture module 1610 may be configured with an image sensor 1614 and a lens 1616 that are the same as those of the image capture module 1110 (e.g., having the same primary characteristics) but vary in optical characteristics due to manufacturing variability and, therefore, have different image correction information associated therewith.

Figure 17:
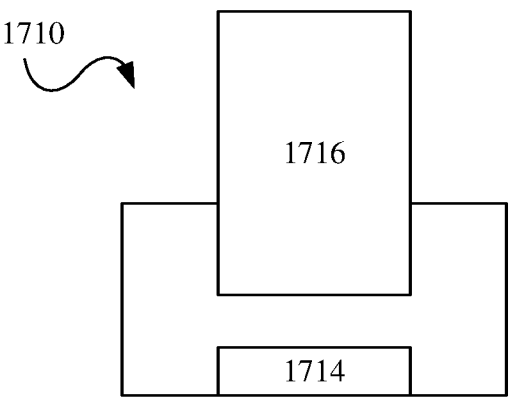
FIG. 17 is a top schematic view of an example of another image capture module in an example image capture device including an integrated sensor-optical component assembly.

FIG. 17 is a top schematic view of an example of another image capture module 1710 in an example image capture device including an integrated sensor-optical component assembly. The image capture module 1710 includes a single image sensor 1714 having a lower resolution than the image sensor 1114, but which includes a single lens 1116 having a lens having a fixed focal length that is longer than the lens 1116.

Figure 18:
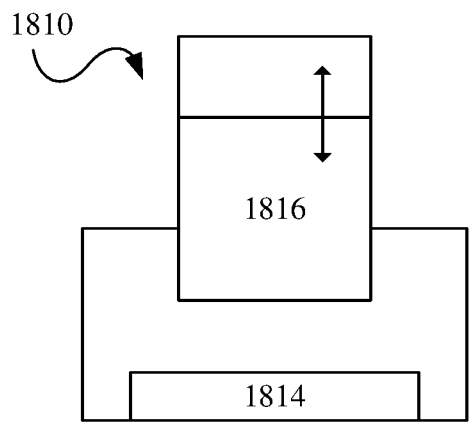
FIG. 18 is a top schematic view of an example of another image capture module in an example image capture device including an integrated sensor-optical component assembly.

FIG. 18 is a top schematic view of an example of another image capture module 1810 in an example image capture device including an integrated sensor-optical component assembly. The image capture module 1810 includes a single image sensor 1814 having the same resolution as the image sensor 1114, but which includes a single lens 1816 having a variable focal length.

Figure 19:
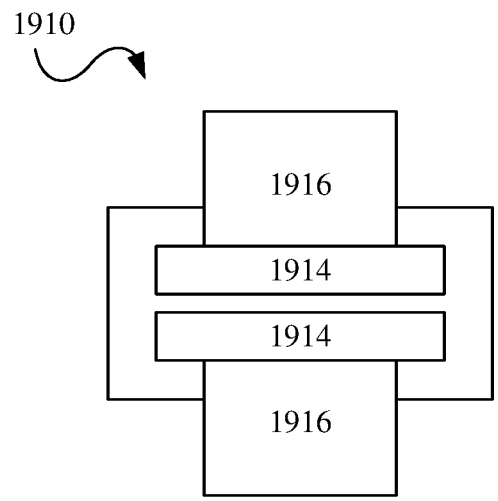
FIG. 19 is a top schematic view of an example of another image capture module in an example image capture device including an integrated sensor-optical component assembly.

FIG. 19 is a top schematic view of an example of another image capture module 1910 in an example image capture device including an integrated sensor-optical component assembly. The image capture module 1910 includes two image sensors 1914 and two lenses 1916 to provide a 360 degree field of view (e.g., forming a spherical camera).

Figure 20:
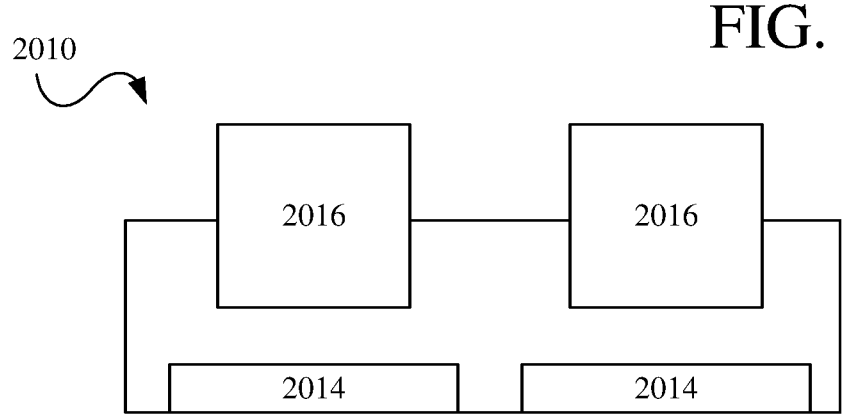
FIG. 20 is a top schematic view of an example of another image capture module in an example image capture device including an integrated sensor-optical component assembly.

FIG. 20 is a top schematic view of an example of another image capture module 2010 in an example image capture device including an integrated sensor-optical component assembly. The image capture module 2010 includes to image sensors 2014 and two lenses 2016 that face the same direction to provide stereoscopic imaging. These examples of different image capture modules are not intended to be limiting, but rather different image capture modules may include different combinations of image sensors and lenses having different characteristics as described herein. Each of the different image capture modules 1110, 1610, 1710, 1810, 1910, 2010 are configured to form the wireless data connection 1170, the conductive power connection 1180, and the mechanical connection 1190 with the base module 1150 in the same manner.

As a result, different ones of the image capture modules 1110 may have different variability characteristics, which may be advantageous for different customers (e.g., lower price point for the image capture module 1110 having a lens 1116 having relatively low image quality and/or fewer features) and different use cases (e.g., macro or long distance, fixed or varying field of view).

The lens 1116 may be fixedly coupled to the image sensor 1114 thereby forming a sensor/lens pair of the image capture module 110. For example, the lens 116 may be secured to the image sensor 1114, or to the printed circuit board 1128 to which the image sensor 1114 is coupled, in a fixed spatial arrangement (e.g., with an adhesive) relative thereto. For example, the lens 1116 may be aligned to the image sensor 1114 using an active alignment process. The active alignment process entails the image sensor 1114 viewing through the lens 1116 one or more images in a controlled environment, and precisely moving the lens 1116 relative to the image sensor 1114 to the fixed spatial arrangement in response to output from the image sensor 1114. For example, the lens 1116 may be precisely moved in six degrees of freedom relative to the image sensor 1114 and then permanently fixed into the fixed spatial arrangement (e.g., using the adhesive).

Due to manufacturing variability in the image sensor 1114 and the lens 1116, the fixed spatial arrangement between the lens 1116 and the image sensor 1114 may vary slightly (e.g., be unique) between the sensor/lens pairs of different ones of the image capture modules 1110 that are otherwise configured similarly (e.g., with the same primary image sensor characteristics and primary lens characteristics). Manufacturing variability of the image sensor 1114 and the lens 1116 of different ones of the image capture modules 1110, as well as the variability in the fixed spatial arrangement, may also result in variability of the characteristics the sensor/lens pair of each image capture module 1110. Such variability may include lens shading, distortion, white balance, pixel defects, color, and chromatic aberration. During assembly of each sensor/lens pair, such as during, before, or after the active alignment processes, such characteristics may be assessed and image correction information may be determined therefor. For example, for each sensor/lens pair, the image correction information may include one or more of a lens shading correction table, a distortion correction table, a white balance correction table, a pixel defect table or map, a color correction table or matrix, or a chromatic aberration correction table. The one or more image correction information may be stored locally by the image capture module 1110 and be transferred to the base module 1150 for processing of image data received thereby (as discussed in further detail below).

The wireless data transfer device 1118 of the image capture module 1110 forms the wireless data connection 1170 with a wireless data transfer device 1158 of the base module 1150, which corresponds thereto. The wireless data transfer device 1118 is configured to wirelessly transmit information, such as the raw image signals 1171 with the raw image information from the image sensor 1114 and/or sensor signals 1172 with the sensor information from the sensors 1126, to the base module 1150 for processing and/or storage thereby. The wireless data transfer device 1118 is enclosed by the housing 1112, for example, being positioned in the cavity 1112a. The wireless data transfer device 118 is located in the housing 1112, so as to facilitate wireless data transmission to the wireless data transfer device 158. For example, the wireless data transfer device 1118 may be positioned against, or otherwise proximate, a wall of the housing 1112 in a fixed location, so as to be positioned in close proximity to the wireless data transfer device 1158 (e.g., being spaced apart less than 10 mm, such as less than 5 mm or less than 3 mm apart).

The wireless data transfer device 1118 and the wireless data transfer device 1158 may employ any suitable wireless data transmission technology, such as Wi-Fi, Bluetooth, or variants thereof, to provide the wireless data connection 1170. In some examples, the wireless data transfer device 1118 and the wireless data transfer device 1158 are capable of data transfer rates suitable for transferring video at various resolutions and/or frame rates, which may include 4K raw video at 30 frames per second. In one example, the wireless data transfer device 1118 and the wireless data transfer device 158 may employ technology promoted by Keyssa, Inc., which may be referred to as "Kiss Connectivity." "Kiss Connectivity" is described as a "solid-state connectivity solution" that provides "a private point-to-point data transmission of up to 6 Gbit/s," and that can provide an effective data rate of 4 Gbit/s with power consumption of 50 mW.

Use of the wireless data connection 1170 may be advantageous compared to transferring data via a wired connection. A high speed wired data connection may, for example, require physical contact at 60 locations, for example with pins being received by corresponding receptacles, which may provide more points for risk of water intrusion, require greater force forming the connection, and/or provide more points for failure, such as missed connections and/or risk for damage. In contrast, the wireless data connection 170 limits apertures in the respective housings 1112, 1152 so at to limit points for water intrusion, requires no force to form the data connection, and prevents physical contact that might otherwise damage data transmitters.

The wireless data transfer device 1118 is in direct or indirect wired communication with the image sensor 1114 for receiving the image information therefrom. For example, each of the wireless data transfer device 1118 and the image sensor 1114 may be connected to the printed circuit board 1128 with conductors (e.g., traces; not shown) extending directly therebetween, or an intermediate electronic component may be arranged therebetween. For example, output from the image sensor 1114 may be transmitted and/or processed by another component (e.g., an intermediate controller or signal processor, such as an analog-to-digital converter or the controller 1122) before the image information reaches the wireless data transfer device 1118. The wireless data transfer device 1118 is similarly in direct or indirect wired communication with the other sensors 126 for receiving the sensor information therefrom.

The wireless data transfer device 1118 of the image capture module 1110 may also be configured to wirelessly receive information from the wireless data transfer device 1158 of the base module 1150, for example, with a control signal 1173. The information received by image capture module 1110 in the control signal 1173 may include image module instruction information from the base module 1150, which is used for operating the various components of the image capture module 1110. These instructions may, for example, include instructions based on user selections and/ or automated controls (e.g., programming) of the base module 1150 to control operation of the image sensor 1114 (e.g., on/off, speed/frame rate), the lens 1116 (e.g. zoom), and the sensors 1126 (e.g., on/off, sensitivity, etc.).

The power unit 1120 of the image capture module 1110 and a power storage device 1160 of the base module 1150 cooperatively form the conductive power connection 1180. The power unit 1120 is configured to receive electrical power from the base module 1150. For example, the power unit 1120 may include power contacts 1120a (e.g., pads, pins, or receptacles) that are conductive and configured to mate with power contacts 1160a of the power storage device 1160 of the base module 1150, which correspond thereto. The power contacts 1120a (e.g., three as shown or more or less) are exposed to outside the housing 1112, so as to allow physical contact with the power contacts 1160a of the base module 1150, which correspond thereto. For example, the power contacts 1120a may protrude from, sit within (e.g., flush), or be recessed relative to apertures in the housing 1112. The power contacts 1120a may additionally be sealed with the housing 1112, for example, to for the cavity 1112a to be waterproof. The power unit 1120 may otherwise be positioned in the cavity 1112a.

The power unit 1120 is additionally configured to distribute the electrical power to the various electrically powered components of the image capture module 1110, including the image sensor 1114, the controller 1122, and the sensors 1126. For example, the power unit 1120 may be connected to the printed circuit board 1128, while conductors (e.g., traces; not shown) conduct the electrical power from the power unit 1120 directly or indirectly (e.g., with an intermediate component, such as the controller 1122) to the electrically powered components.

The power unit 1120 may additionally be configured to condition the electrical power for use by one or more of the electrical components of the image capture module 1110. For example, reliable operation of the image sensor 1114 may be susceptible to power fluctuations. The power unit 1120 includes power conditioning circuitry that receives the electrical power from the base module 1150 and conditions the electrical power to produce conditioned electrical power that, for example, is within voltage and/or current requirements of the image sensor 1114. The conditioned electrical power is then provided to the image sensor 1114.

As referenced above, the image capture module 1110 may also include a controller 1122, which may be configured to control operation of various other components of the image capture module 1110, such as the image sensor 114, the lens 116 (e.g., if having a zoom function), the wireless data transfer device 1118, the power unit 1120, and/or the other sensors 1126. For example, the controller 1122 may control operation of the various other components of the image capture module 1110 according to the control signal 1173 received from the base module 1150 (e.g., based on user selections and/or automated controls from the base module) and/or programming stored by the controller 1122. The controller 1122 may, for example, be configured as the controller 1500 shown in FIG. 15. The controller 1122 is in wired communication with those components that provide inputs thereto and/or are controlled thereby, for example, by being connected to the printed circuit board 1128 and having conductors (e.g., traces; not shown) extending therebetween.

As referenced above, the image capture module 1110 may also include a non-volatile memory 1124 that stores image module information associated with the image capture module 1110. The image module information may be transmitted to the base module 1150 via an image module information signal 1174 sent by the wireless data transfer device 1118. The non-volatile memory 1124 is positioned within the housing 1112, for example, in the cavity 1112a thereof. The non-volatile memory 1124 is in wired communication with the wireless data transfer device 1118, for example, by being connected to the printed circuit board 1128. The non-volatile memory 1124 may, for example, be the storage device 1530 of the controller 1500. In an implementation, the image module information may be the identification data or a part thereof as described herein. In an implementation, the identification data may be sent in wired or wireless form as described herein The image module information stored by the non-volatile memory 1124 may include various types of information associated with the image capture module 1110, such as the image correction information (described above), image module control information, and/or security information, which may be used by the base module 1150. The image correction information (e.g., one or more image correction tables) may be used by the base module 1150 when processing and/or storing image data. The image module control information may be used by the base module 1150 for controlling operation of the image capture module 1110 with the base module 1150. For example, the image module control information may include software programming enabling control of various functions of the image capture module 1110 not previously stored by the base module 1150. For instance, the base module 1150 may already include (e.g., be preprogrammed with) image module control information for operation of image capture modules 1110 having certain configurations (e.g., specific combinations of primary sensor characteristics and primary lens characteristics), certain components, or certain features (e.g., mechanical zoom, sensors 1126), but may not include image control information required for operation of other configurations, other components, or other features. Security information may include, for example, digital rights management (DRM) security protocols that permit use of the image capture module 1110 with the base module 1150. The image control module information may be transferred form the image capture module 1110 and thereafter be stored by the base module 1150 (e.g., a memory thereof), and thereafter be used by the base module 1150 for controlling or operating another image capture module 1110. In an implementation, this information may be the identification data or a part thereof. In an implementation, this data may be used to reconfigure the SoC, controller, image signal processor or base module for optimal operation with the image capture module as described herein above with respect to FIGS. 6-9.

The base module 1150 generally includes a housing 1152, an image signal processor 1154, an encoder 1155, and a storage device 1156. The base module 1150 may additionally include the one or more wireless data transfer devices 1158 (referenced above), a power storage device 1160, a controller 1162, or a user interface 1164. The base module 1150 may further include sensors 1166, such as one or more audio sensors (e.g., microphones), one or more motion sensors (e.g., gyroscope, inertia measurement unit (IMU)), and one or more position or orientation sensors (e.g., altimeter, global positioning (GPS), magnetometer or compass). The image signal processor 1154 may also be referred to as an ISP or image processor. The encoder 1155 may also be referred to as an encoder processor or encoding device. The storage device 1156 may also be referred to as a memory, mass memory, mass memory storage, or mass storage device.

The various electrical components of the base module 1150, such as the image signal processor 1154, the encoder 1155, the storage device 1156, the wireless data transfer device 1158, and the controller 1162 may be mounted (e.g., physically and/or functionally connected) to a printed circuit board 1168 (e.g., PCB) located in the housing 1152.

The housing 1152 defines one or more cavities in which the various electrical components are positioned. The housing 1152 is configured to prevent contaminants, such as dust or water, from reaching the other electrical components in the cavity 1112a, for example, by satisfying one or more ingress protection standards (referenced above).

The image signal processor 1154, the encoder 1155, and the storage device 1156 are discussed in turn below following discussion of the wireless data transfer device 1158.

As referenced above, the wireless data transfer device 1158 of the base module 1150 and the wireless data transfer device 1118 of the image capture module 1110 cooperatively form the wireless data connection 1170. The wireless data transfer device 1158 is configured to wirelessly receive information from the wireless data transfer device 1118 of the image capture module 1110, for example, via the raw image signal 1171, the sensor signal 1172, and the image module information signal 1174. The wireless data transfer device 1158 may also transmit information to the wireless data transfer device of the image capture module 1110, such as image module instructions with the control signal 1173. The wireless data transfer device 1158 is further configured to transfer such information to various other components of the base module 1150, such as the image signal processor 1154 and the controller 1162, for example, by being connected to the printed circuit board 1168. The wireless data transfer device 1158 is located in a fixed position within the housing 1152, so as to be arranged in a predetermined spatial arrangement (e.g., close proximity) with the wireless data transfer device 1118 when the image capture module 1110 is connected to the base module 1150.

The image signal processor 1154 of the base module 1150 processes the raw image information captured by the image sensor 1114 of the image capture module 1110. For example, the image signal processor 1154 may receive image information, such as the raw image information, from the wireless data transfer device 1158, and process the raw image information. For example, the image signal processor 1154 may convert the raw image information in the form of RGB data to processed image information in the form of YUV or YCbCr data, as understood in the art. The image signal processor 1154 may additionally receive the image module information and process the raw image information and/or the processed image information according thereto. More specifically, the image signal processor 1154 may receive the image correction information, such as the lens shading correction table, the distortion correction table, the white balance correction table, the pixel defect table or map, the color correction table or matrix, or the chromatic aberration correction table, and process the image information (e.g., raw image information or processed image information) according thereto.

The image signal processor 1154 receives the raw image information from the wireless data transfer device 1158 and transmits the processed image information to the encoder 1515, for example, by being connected to the printed circuit board 1168. The image signal processor 1154 is additionally contained within the housing 1152 that is waterproof. The image signal processor 1154 may be a standalone component or group of components, for example, having a processor, volatile memory (e.g., RAM), and non-volatile memory that stores software programming that may be executed by the processor thereof for processing the raw image information. Alternatively, the image signal processor 1154, or functions thereof, may be performed by the controller 1162 of the base module 1150.

The encoder 1155 processes (e.g., converts or compresses) the processed image information to produce encoded image information. For example, the encoder 1155 may convert the processed image information (e.g, YUV or YCbCr data) into the encoded image information according to known standards, such as MPEG video format).

The encoder 1155 receives the processed image information from the image signal processor 1154 and transmits the encoded image information to the storage device 1156, for example, by being connected to the printed circuit board 1168. The encoder 1155 is additionally contained within the housing 1152 that is waterproof. The encoder 1155 may be a standalone component or group of components, for example, having a processor, volatile memory (e.g., RAM), and non-volatile memory that stores software programming that may be executed by the processor thereof for processing the processed image information. Alternatively, the encoder 1155, or functions thereof, may be performed by the image signal processor 1154 or the controller 1162.

Still further, the image signal processor 1154 and/or the encoder 1155 may be omitted from the base module 1150 and instead be incorporated into the image capture module 1110. In such an arrangement, the processed image information or the encoded image information is transferred by the wireless data connection 1170 from the image capture module 1110 to the base module 1150 for further processing (e.g., encoding by the encoder 1155) and/or storage by the storage device 1156.

The image sensor 1114 of the image capture module 1110, the image signal processor 1154 of the base module 1150, and the encoder 1155 of the base module 150 may be considered to cooperatively form an image processing pipeline (e.g., an image processing and encoding pipeline) by cooperatively capturing raw image information, processing the raw information to produce the processed image information, and encoding the processed image information to provide the encoded image information that may be stored in a common image or video format. Further, because the image sensor 1114, the image signal processor 1154, and the encoder 1155 are components of separate modules, the image processing pipeline may be considered a physically segregated image processing pipeline and/or an image processing pipeline that incorporates wireless data transmission of image information (e.g., the raw image information) prior to processing and/or encoding thereof.

The storage device 1156 is configured to store the encoded image information. The storage device 1156 is a non-volatile storage device, such as a solid-state drive or hard disk drive. The storage device 1156 may be permanently or removably contained by the housing 1152 that is waterproof, so as to be protected from contaminants. The storage device 1156 is in wireless communication with the encoder 1155, for example, via the printed circuit board 1168.

As referenced above, the power storage device 1160 forms the conductive power connection 1180 with the power unit 1120 of the image capture module 1110. The power storage device 1160 is configured to store electrical energy and transfer the electrical energy to the electrically powered components of the base module 1150 (e.g., the image signal processor 1154, the encoder 1155, storage device 1156, the wireless data transfer device 1158, the controller 1162, and the sensors 1166) and the electrical components of the image capture module 1110 (as described above). For example, the power storage device 1160 may be electrically coupled to the printed circuit board 1168 to distribute electrical power to the electrical power components of the base module 1150. The power storage device 1160 may, for example, include a battery that is permanently or removably held in the housing 1152. The power storage device 1160 additionally includes the power contacts 1160a (e.g., pins, pads, or receptacles) that are complementary to the power contacts 1120a of the image capture module 1110 to form conductive connections for electrical power transfer therebetween. The power contacts 1160a are exposed outside the housing 1152, for example by protruding from, being flush with, or being recessed from apertures in the housing 1152, so as to make physical contact with the power contacts 1120a of the image capture module 1110.

The controller 1162 is configured to control operation of the various components of the base module 1150, such as the image signal processor 1154, the encoder 1155, the wireless data transfer device 1158, the power storage device 1160, the user interface 1164, and the sensors 1166. The controller 1162 may further be configured to control operation of the various components of the image capture module 1110, for example, by providing the image module instructions via the control signal 1173 to the controller 1122 thereof. The controller 1162 may control operation of the various components according to user inputs (e.g., received via the user interface 1164) and/or according to stored programming. The controller 1162 may be configured as the controller 1500 shown in FIG. 15. The controller 1162 is in wired communication with the components of the base module 1150 that provide inputs thereto and/or that are controlled thereby, for example, by being connected to the printed circuit board 1168 and having conductors (e.g., traces; not shown) extending therebetween. The controller 1162 is additionally contained within the housing 1152 that is waterproof, so as to be protected from contaminants. In an implementation, the controller 1162 and image signal processor 1154 may be configured or calibrated based on identification data provided by the image capture module as shown in FIG. 7.

The user interface 1164 is configured to receive inputs from a user and/or to provide outputs thereto. The user interface 1164 may, for example, be a touch screen display (e.g., capacitive LCD display screen). The user interface 1164 provides options that may be selected by the user to control operation of the image capture device 1000, such as video recording functions (e.g., start/stop, resolution, frame rate, etc.). The user interface 1164 may also provide information about the image capture device 1000 to the user, such as remaining storage capacity of the storage device 1156, remaining power capacity of the power storage device 1160. The user interface 1164 may also be able to display the encoded image information stored by the storage device 1156 (e.g., displaying video and/or still images).

The user interface 1164 may additionally be reconfigured according to the image capture module 1110 connected to the base module 1150. For example, based on the image module information received in the image module information signal 1174, the user interface 1164 provides options that may be associated with some types of image capture modules 1110 and not others. For example, the user interface 1164 may display options associated with image capture modules 1110 having the lens 1116 with a controllable zoom function (e.g., a zoom level control option) or with multiple image sensors 1114 (e.g., stereoscopic or monocular control options), which are not associated with image capture modules 1110 having a single image sensor 1114 and a single lens 1116 of fixed focal length.

Operation of the user interface 1164 may, for example, be controlled by the controller 1162. The user interface 1164 is in wired communication with the controller 1162, for example, by being connected to the printed circuit board 1168. The user interface 1164 is contained in or may form an outer surface of the housing 1152 that is waterproof.

As referenced above, the base module 1150 may include one or more sensors 1166, such as audio sensors, motion sensors, and position or orientation sensors. The sensors 1166 collect sensor information that may be stored by the storage device and associated with the image information stored thereby (e.g., the encoded image information).

The mechanical connection 1190 between the image capture module 1110 and the base module 1150 is configured to physically connect the image capture module 1110 to the base module 1150 in a predetermined spatial configuration. The mechanical connection 1190 is releasable and configured for the image capture module 1110 and the base module 1150 to support each other. The predetermined spatial configuration between the image capture module 1110 and the base module 1510 brings the wireless data transfer devices 1118, 1158 thereof into a predetermined special configuration (e.g., close proximity and alignment) to form the wireless data connection 1170. Further, the predetermined spatial configuration between the image capture module 1110 and the base module 1150 brings the power contacts 1120a, 1160a thereof into physical contact with each other to form the conductive power connection 1180.

The mechanical connection 1190 may be formed in different manners. For example, as shown in FIGS. 13-14, the image capture module 1110 includes one or more protrusions 1191 that are configured to be received by receptacles 1192 of the base module 1150. The receptacles 1192 may, for example, include latch mechanisms (not shown) that releasably engage and retain the protrusions 1191 inside the receptacles 1192 and, thereby retain the image capture module 1110 to the base module 1150. The mechanical connection 1190 instead be formed in other manners that include one or more of a cam lock mechanism, magnets, interference fit, or other latch mechanism.

The mechanical connection 1190 is additionally configured to isolate one or both of the wireless data connection 1170 and the conductive power connection 180 from water intrusion. For example, the base module 1150 may include a seal 1193 (e.g., a gasket) that surrounds the power contacts 1160a and the surface of the housing 1152 adjacent the wireless data transfer device 1158 (depicted in dashed lines to represent being contained in the housing 1152). The mechanical connection 1190 is configured to compress the seal 1193 between the base module 1150 and the image capture module 1110, so as to form a water proof seal therebetween that prevents water intrusion therebetween in regions where the power contacts 1120a of the image capture module 1110 and the power contacts 1160a of the of the base module 1150 contact each other to form the conductive power connection 1180 and/or in regions where the wireless data transfer device 118 of the image capture module 1110 and the wireless data transfer device 1158 of the base module 1150 are positioned proximate each other to form the wireless data connection 1170.

Figure 15:
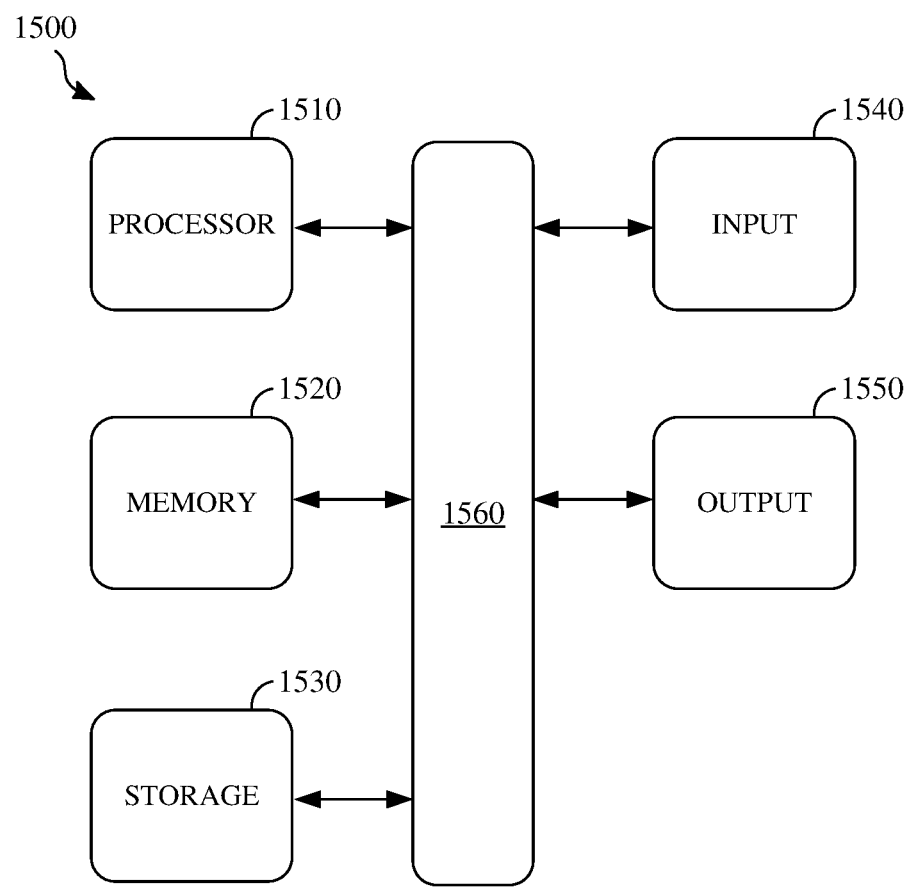
FIG. 15 is a schematic view of an example controller that may be included in an image capture device including an integrated sensor-optical component assembly.

FIG. 15 is a schematic view of an example controller 1500 that may be included in an image capture device including an integrated sensor-optical component assembly. The controller 1500 may be used as the controller 122, the controller 162, or to otherwise implement the image capture devices described herein. The controller 1500 generally includes a processor 1510, a memory 1520, a storage device 1530, one or more input devices 1540 (e.g., the image sensor 1114, the sensors 1126, the sensors 1166, the user interface 1164, the wireless data transfer devices 1118, 1158), and one or more output devices 1550 (e.g., the user interface 1164, the wireless data transfer devices 1118, 1158, the storage device 1156, etc.). The controller 1500 can also include a bus 1560 by which the various other components of the controller 1500 may communication with each other. The processor 1510 executes instructions (e.g., computer program instructions). For example, the processor 1510 may be a central processing unit (CPU) or other conventional device. The memory 1520 may be any suitable type of short-term information storage device (e.g., random-access memory or other volatile, high-speed storage device). The storage device 1530 may be a non-volatile storage device (e.g., a solid-state drive). The input devices 1540 may be any suitable input device, such as the user interface 1164, the image sensor 1114d, the wireless data transfer devices 1118, 1158, described previously. The output devices 1550 may be any suitable output device, such as the user interface 1164 or the wireless data transfer devices 1118, 1158, described previously.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements that are not in direct contact with each other, yet still co-operate or interact with each other, or are structured to provide a thermal conduction path between the elements.

Likewise, as used herein, the terms "includes," "comprising," "including," "has," "having," or any other variation thereof, are intended to cover a non-exclusive inclusion. For example, a process, method, article, or apparatus that includes a list of elements is not necessarily limited to only these elements but may also include other elements not expressly listed to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein, any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

Upon reading this disclosure, those of skill in the art will appreciate still additional alternative structural and functional designs for a multi-configuration mounting system as disclosed from the principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation, and details of the method and apparatus disclosed herein without departing from the spirit and scope defined in the appended claims.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capturing device, comprising:
a lens configured to capture content information, the lens configured to draw power from a source on the lens; and
a base module having a processor, for processing the content information, and a user interface,
wherein the lens is releasably attachable to the base module, and
wherein the processor and the user interface are configurable based on identification data received from the lens when the lens is releasably attached to the base module.

2. The image capturing device of claim 1, wherein the processor is at least one of a system-on-chip and an image signal processor.

3. The image capturing device of claim 1, wherein the lens is further configured to wirelessly transmit the identification data to the base module.

4. The image capturing device of claim 3, wherein the lens is further configured to wirelessly transmit the content information to the base module.

5. The image capturing device of claim 1, wherein the lens is configured to draw power from the base module.

6. The image capturing device of claim 1, wherein the processor is further configured to calibrate at least the base module based on the identification data.

7. The image capturing device of claim 1, wherein the lens is configured to store at least the identification data that is transferred to the base module and in accordance with which the base module operates the lens.

8. The image capturing device of claim 1, wherein the lens includes an electric motor for operable control of the lens.

9. The image capturing device of claim 8, wherein the base station is configured to send instructions to control operation of the lens.

10. The image capturing device of claim 1, wherein the identification data is different for different lenses.

11. The image capturing device of claim 1, wherein the source is a battery.

12. The image capturing device of claim 1, wherein the lens is configured to receive exposure data from the base module.

13. The image capturing device of claim 1, wherein the identification data includes security information.

14. The image capturing device of claim 1, wherein the identification data is used by the processor to load one of multiple firmware sets.

15. A method of using an image capturing device, comprising:
releasably attaching an optical component to a base module to form the image capturing device;
receiving control information at the base module from the optical component, wherein the control information is different for different optical components, wherein the control information is security information;
configuring a processor and a user interface in the base module based on the control information;
calibrating the base module based on the control information; and
capturing content using the releasably attached optical component.

16. The method of claim 15, further comprising:
powering the optical component from at least one of the base module and a power source of the optical component.

17. The method of claim 15, further comprising:
sending, from the base module to the optical component, instructions to operably control the optical component, the optical component including a motor.

18. The method of claim 15, wherein the security information is digital rights management security protocols.

19. An image capturing device, comprising:
a lens assembly configured to communicate light to an image sensor; and
a base module having a user interface and a processor, the processor configured to process image information,
wherein the lens assembly is releasably attachable to the base module, and
wherein the processor and the user interface are configurable based on identification data received from the lens assembly when the lens assembly is releasably attached to the base module, the identification data is used by the processor to load one of multiple firmware sets.

20. The image capturing device of claim 19, the lens assembly including a motor, wherein the base module is configured to send instructions to control operation of the motor to control functionality of the lens assembly.

* * * * *